(12) United States Patent
Lu et al.

(10) Patent No.: US 8,996,249 B2
(45) Date of Patent: *Mar. 31, 2015

(54) ADAPTIVE ACTIVE SUSPENSION SYSTEM WITH ROAD PREVIEW

(71) Applicant: Ford Global Technologies, LLC, Dearborn, MI (US)

(72) Inventors: Jianbo Lu, Livonia, MI (US); Dimitar P. Filev, Novi, MI (US); Davor Hrovat, Ann Arbor, MI (US); Eric Hongtei Tseng, Canton, MI (US); Uwe Hoffmann, Leverkusen (DE); Simon Baales, Cologne (DE); Michael Seeman, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,137

(22) Filed: Jul. 21, 2014

(65) Prior Publication Data
US 2014/0330483 A1 Nov. 6, 2014

Related U.S. Application Data

(63) Continuation of application No. 13/736,292, filed on Jan. 8, 2013, now Pat. No. 8,788,146.

(51) Int. Cl.
*B60G 17/0165* (2006.01)
*B60G 17/018* (2006.01)
(Continued)

(52) U.S. Cl.
CPC ............ *B60G 17/015* (2013.01); *B60G 17/016* (2013.01); *B60G 17/0165* (2013.01); *B60G 17/018* (2013.01); *B60G 2401/21* (2013.01); *G01S 17/88* (2013.01); *G01S 17/936* (2013.01); *B60G 17/0195* (2013.01); *B60G 17/02* (2013.01); *B60G 17/06* (2013.01);
(Continued)

(58) Field of Classification Search
CPC ............... B60G 17/015; B60G 17/018; B60G 17/0165; B60G 2401/21; G01S 17/88; G01S 17/936
See application file for complete search history.

(56) References Cited

U.S. PATENT DOCUMENTS 4,781,465 A * 11/1988 Demachi et al. ............... 356/602
5,450,322 A * 9/1995 Tanaka et al. .................... 701/37
(Continued)

OTHER PUBLICATIONS

Lee et al.; Real-Time Grid Map Generation and Object Classification for Ground-Based 3D Lidar Data Using Image Analysis Techniques; Image Processing (ICIP), 2010 17th IEEE International Conference; pp. 22-53-2256; Sep. 26-29, 2010.*

(Continued)

*Primary Examiner* — Michael J Zanelli
(74) *Attorney, Agent, or Firm* — L.C. Begin & Associates, PLLC

(57) ABSTRACT

A method for controlling an active suspension is disclosed. The method includes steps of determining a dimension of a road abnormality ahead of the vehicle; comparing the dimension with a vehicle dimension; responsive to the comparison, classifying the abnormality as one type of a plurality of predetermined types; responsive to a dimension of the abnormality, further classifying the abnormality as having a severity of one type of a plurality of predetermined types; and controlling the suspension responsive to the abnormality type and severity type.

10 Claims, 6 Drawing Sheets

(51) Int. Cl.

| | |
|---|---|
| *B60G 17/015* | (2006.01) |
| *G01S 17/88* | (2006.01) |
| *B60G 17/016* | (2006.01) |
| *G01S 17/93* | (2006.01) |
| *B60G 17/0195* | (2006.01) |
| *B60G 17/02* | (2006.01) |
| *B60G 17/06* | (2006.01) |

(52) U.S. Cl.
CPC . *B60G2400/0521* (2013.01); *B60G 2400/0522* (2013.01); *B60G 2400/0523* (2013.01); *B60G 2400/102* (2013.01); *B60G 2400/104* (2013.01); *B60G 2400/106* (2013.01); *B60G 2400/20* (2013.01); *B60G 2400/25* (2013.01); *B60G 2400/52* (2013.01); *B60G 2400/96* (2013.01); *B60G 2401/14* (2013.01); *B60G 2401/16* (2013.01); *B60G 2500/10* (2013.01); *B60G 2500/20* (2013.01); *B60G 2500/30* (2013.01); *B60G 2400/82* (2013.01)
USPC .......................................... 701/37; 280/5.518

(56) References Cited

U.S. PATENT DOCUMENTS

| | | | | |
|---|---|---|---|---|
| 6,683,533 | B1* | 1/2004 | Ashihara et al. .............. | 340/435 |
| 7,752,483 | B1* | 7/2010 | Muresan et al. .............. | 713/601 |
| 8,332,134 | B2* | 12/2012 | Zhang et al. .................. | 701/301 |
| 2009/0097038 | A1* | 4/2009 | Higgins-Luthman et al. ............................. | 356/602 |
| 2010/0106356 | A1* | 4/2010 | Trepagnier et al. ............. | 701/25 |

OTHER PUBLICATIONS

Himmelsbach et al.; Real-Time Object Classification in 3D Point Clouds Using Point Feature Histograms; Intelligent Robots and Systems; IROS 2009; IEEE/RSJ International Conference; pp. 994-1000; Oct. 10-15, 2009.*

* cited by examiner

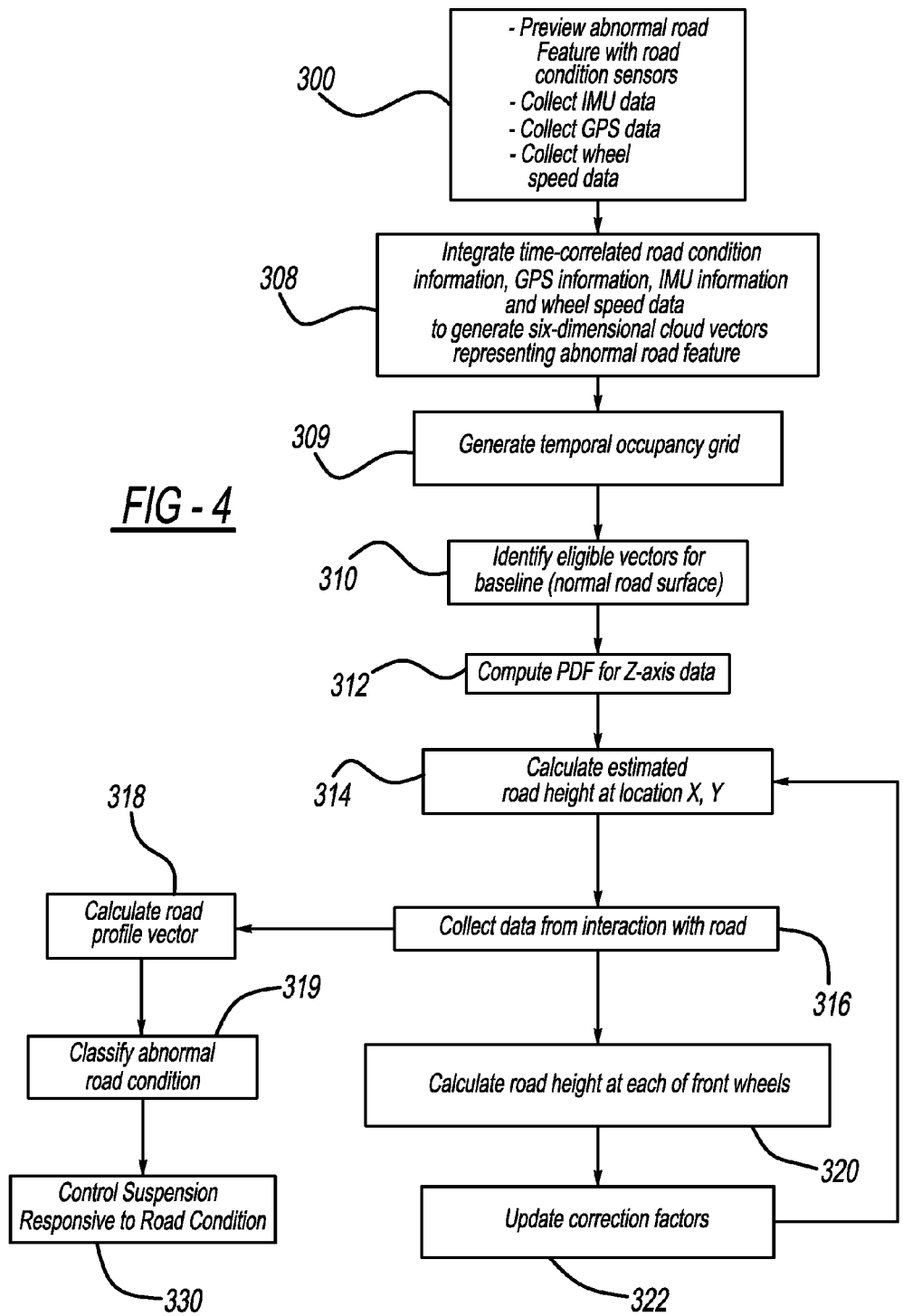

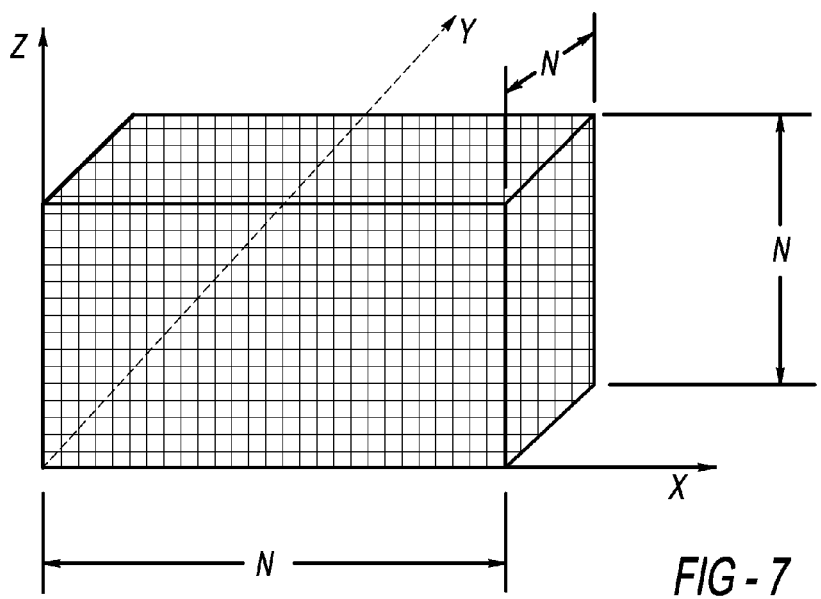
*FIG - 7*
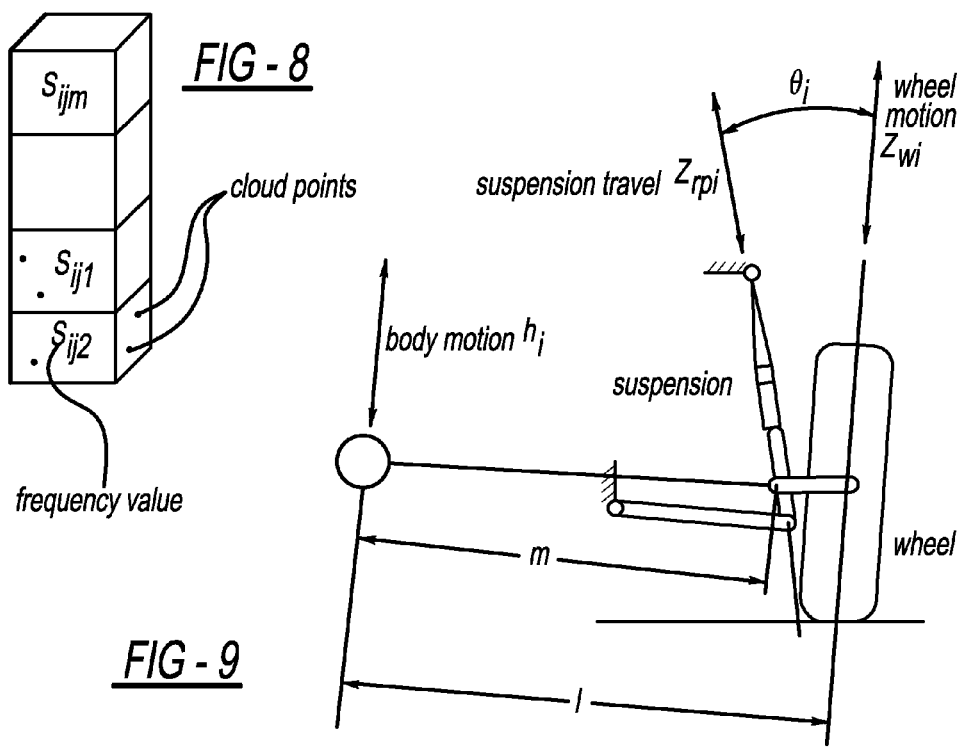
*FIG - 8*
*FIG - 9*

ADAPTIVE ACTIVE SUSPENSION SYSTEM WITH ROAD PREVIEW

CROSS-REFERENCE TO RELATED APPLICATIONS

This application is a continuation of, and claims the benefit of, U.S. application Ser. No. 13736,292 (filed on Jan. 8, 2013), the disclosure of which is hereby incorporated by reference in its entirety.

BACKGROUND OF THE INVENTION

The embodiments of the present invention relate to vehicle suspension control systems and, more specifically, to a vehicle suspension control system adaptable to predicted and actual abnormal road conditions.

Passenger vehicles are designed to drive on a variety of road surfaces and geometric conditions. Occasionally, a vehicle encounters exceptional (abnormal) road conditions, such as debris, severe potholes, bumps and the like. Adaptive or active suspension systems enable selective adjustment of the suspension characteristics such as damping and stiffness, responsive to the contact between the vehicle wheels and the abnormal road feature. This helps improve the vehicle's ride comfort, handling, and safety.

However, in order for conventional active suspensions to operate the actuatable elements of the suspension system responsive to the abnormal road feature, the vehicle wheels must contact the road feature. Due to the need to interact with the abnormal road feature prior to operating the actuatable suspension elements, the system response may not be as timely and effective as it might otherwise be, because of factors such as the dynamic response times of the system as a whole and the individual system elements, and the speed of the vehicle.

Certain vehicle design parameters may also be tailored to mitigate the effects of interaction between the vehicle and abnormal road features. For example, providing a vehicle with a relatively higher ground clearance reduces its susceptibility to damage due to many bumps in the road or debris located on the road surface. However, a vehicle with higher ground clearance may have a relatively greater fuel consumption than a vehicle with a smaller ground clearance.

In view of the above, it is desirable to incorporate an adaptive or active suspension system into the vehicle to enable selective adjustment of characteristics such as suspension stiffness and damping responsive to abnormal road conditions. It is also desirable to have advance notice of the type and severity of any abnormal road or driving conditions so that actuatable elements of a vehicle control system can be actuated in real time to help mitigate the undesirable consequences of driving over the abnormal surfaces, if necessary before the vehicle wheels encounter the abnormal road condition.

Thus, it is desirable to detect an abnormal road condition, predict the severity of the condition, and operate actuatable elements of the suspension system in response to the predicted type and severity of the abnormal road condition. For efficiency, it is also desirable that the suspension control system operates the actuatable system elements only for the length of time (and only to the degree) needed to mitigate the deleterious effects of a particular abnormal road condition.

SUMMARY OF THE INVENTION

In one aspect of the embodiments described herein, a method for controlling an active suspension is provided. The method includes steps of determining a dimension of a road abnormality ahead of the vehicle; comparing the dimension with a vehicle dimension; responsive to the comparison, classifying the abnormality as one type of a plurality of predetermined types; responsive to a dimension of the abnormality, further classifying the abnormality as having a severity of one type of a plurality of predetermined types; and controlling the suspension responsive to the abnormality type and severity type.

BRIEF DESCRIPTION OF THE DRAWINGS

In the drawings illustrating embodiments of the present invention:

FIG. 4 is a flow diagram illustrating a method in accordance with one embodiment of the present invention for generating a model or representation of an abnormal road surface ahead of a moving vehicle.

FIG. 7 is a representative example of a three-dimensional grid constructed for use in representing the x, y, and z dimensions of an abnormal road feature, in accordance with one embodiment of the present invention.

FIG. 8 shows a representation of cells of a three-dimensional grid containing cloud points for use in generating a probability density function representing the heights of points on the surface of an abnormal road feature, in accordance with one embodiment of the present invention.

FIG. 9 is an illustration of the suspension parameters used in calculating suspension height measurement vector $z_{rp}$ in accordance with an embodiment of the present invention.

DETAILED DESCRIPTION

Figure 1:
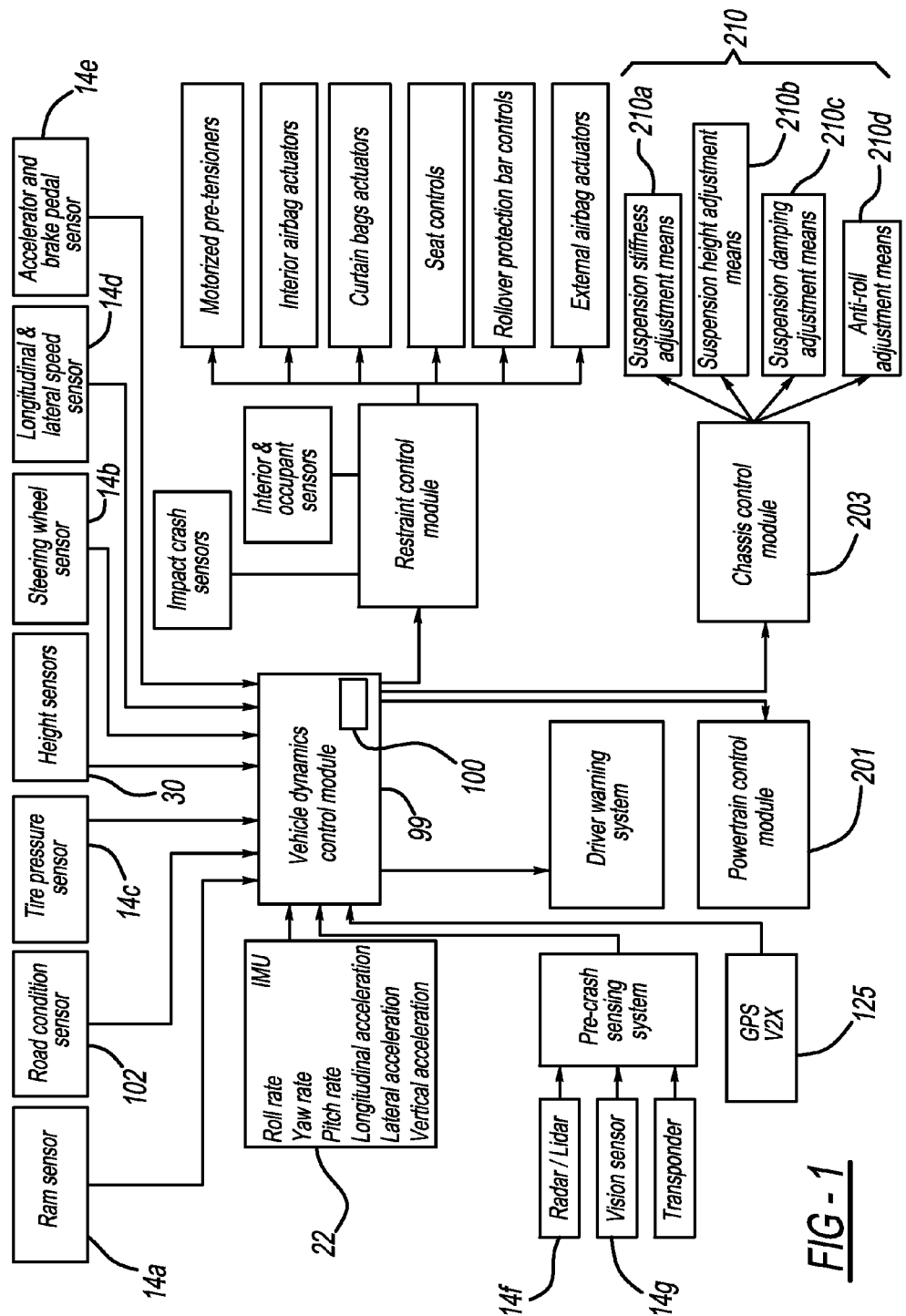
FIG. 1 is a schematic diagram of a vehicle control system incorporating an adaptive active suspension control system in accordance with embodiments of the present invention.

FIG. 1 is a schematic diagram of a vehicle control system 12 incorporating an active suspension system in accordance with an embodiment of the present invention. Control system 12 includes an array of vehicle sensors designed to monitor various vehicle parameters and environmental conditions external to the vehicle. The sensor array includes various types of sensors operatively coupled to one or more system control modules so as to enable transmission of the sensor inputs to the control module(s). The sensor array may include individual sensors or groups of associated sensors such as radar, lidar, laser scan, or vision/camera systems) for detecting aspects of the vehicle environment and for detecting, for example, a pending collision; inertial sensors (for example, a known or suitable inertial measurement unit (IMU) 22), various wheel speed sensors 14*f*, road condition sensors 102 if direct measurements of certain road conditions are possible, rain sensors 14*a*, suspension height sensors 30, steering wheel angle sensors 14*b*, steering torque sensors, brake pressure sensors, tire pressure sensors 14*c*; sensors (such as a Global Positioning System (GPS) 125) directed to aiding in vehicle location and navigation; cooperative sensors for enabling and facilitating operation of vehicle-to-vehicle communication and vehicle-to-infrastructure communication systems (if any), and other types of sensors. A group of associated sensors (for example, a road condition sensor suite) may include multiple different types of sensors, depending on the tasks the suite is required to perform in a given control system. In the particular embodiment shown in FIG. 1, the sensor array includes a road condition sensor or a sensor suite 102 comprising one or more known road condition sensors. The road condition sensors may measure such features as, for example, the road temperature, whether the road surface is wet or dry, the salinity of any road surface moisture, and the presence of snow on the road. The road condition sensors may include such elements as laser scanners or cameras to enable visual or digital scanning of a portion of the road surface being traversed by the vehicle.

The control system 12 also includes one or more control modules operatively coupled to associated sensors (or groups of sensors), to other control modules, and/or to other elements of the control system. Examples of such control modules include a vehicle dynamics control module (or VDCM) 99 or similar main control module, and control modules incorporated into various vehicle subsystems, such as a powertrain control module 201, a chassis control module 203, and a vehicle occupant restraint control module 204. In a manner known in the art, the VDCM 99 receives inputs from various sensors, processes these inputs in accordance with a stored control logic or control routine, and generates control signals which are transmitted to various actuatable control system elements or to suitable subordinate or lower level control modules (for example, chassis control module 203) which control elements of an active suspension system (generally designated 210 in FIG. 1)).

While the interactions among all actuatable vehicle systems are of interest, the embodiments of the present invention focus primarily on the active suspension system where such characteristics as suspension travel or height, suspension damping, suspension stiffness, and suspension force are adjustable in real time with actuation response times low enough to enable suspension system control responsive to predicted or actual abnormal road conditions encountered by a vehicle wheel. The suspension actuations are adaptive to the estimated or predicted road conditions determined using the aforementioned sensing systems and an associated processing means configured to process data received from the sensing systems and determine the type and severity of the abnormal road condition.

In a manner known in the art, the various control modules include processing means which receive and process inputs from the associated sensors or from other elements of the control system (such as other control modules) to generate control signals responsive to the inputs. These control signals are then transmitted to one or more associated actuatable elements, in a manner known in the art. The actuatable vehicle elements and sub-systems operate responsive to the received control signals to control the ride and handling characteristics associated with the vehicle. In certain embodiments, the vehicle may also incorporate cooperative or interactive communication systems, such as vehicle-to-vehicle and/or vehicle-to-infrastructure communications systems.

The control system 12 also includes various actuatable individual elements and elements of various sub-systems affecting characteristics such as ride comfort, handling characteristics, and various safety and driver assistance features. Examples include elements of the active suspension system 210, brake control system 212, steering control system 214, and their constituent and associated elements.

Figure 2:
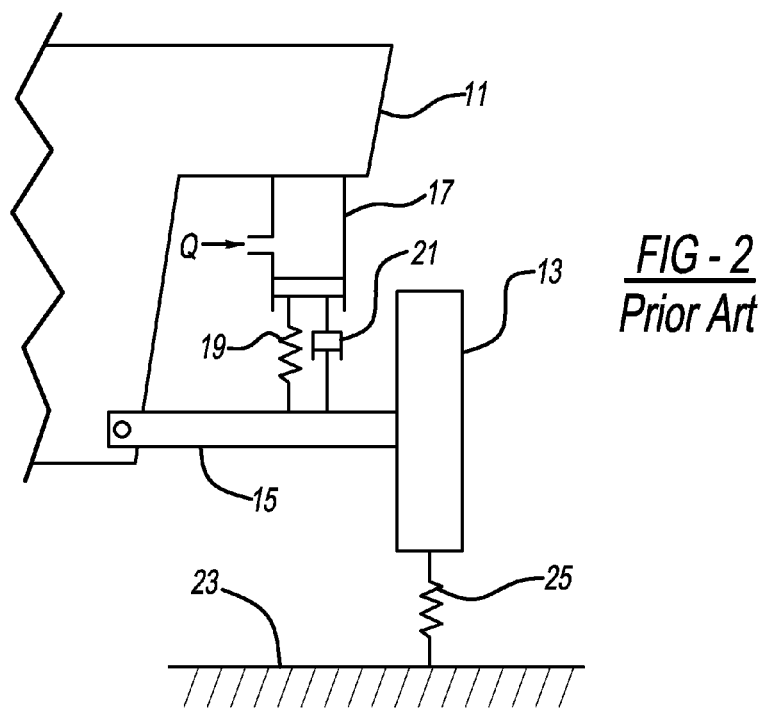
FIG. 2 is a schematic diagram of a portion of an active suspension system controllable in accordance with an embodiment of the present invention.

FIG. 2 is a schematic diagram of one wheel of a vehicle incorporating an active suspension system of a type which may be controlled using input from an estimator means in accordance with the principles of the present invention. As known in the art, an active suspension can be used to improve ride by adjusting suspension damping and/or spring rate characteristics responsive to inputs from the VDCM or other vehicle control modules. In one embodiment, the elements shown in FIG. 2 can be viewed as a single vehicle wheel movable in a vertical direction. In this representation, the mass of the vehicle's body is represented by the sprung mass 11. The wheel, represented by the unsprung mass 13, is attached to the vehicle body 11 by a control arm 15. The body 11 is supported above the unsprung wheel mass 13 by an active suspension system including control arm 15, a spring 19, a damper 21, and a volume of fluid 17 which acts in series with spring 19 and damper 21. By controlling a fluid flow Q into or out of an actuator 17 (for example, a hydraulic actuator), the suspension forces and ride heights can be controlled. The wheel's unsprung mass 13 is supported by the road surface 23, the tire deflection being represented in FIG. 2 by the spring 25.

A control system incorporating an estimator means as described herein may alternatively be used to control other types of actuators and suspension system elements, for example, the suspension forces can be used for controlling the dynamic normal loading of each wheel.

Figure 3:
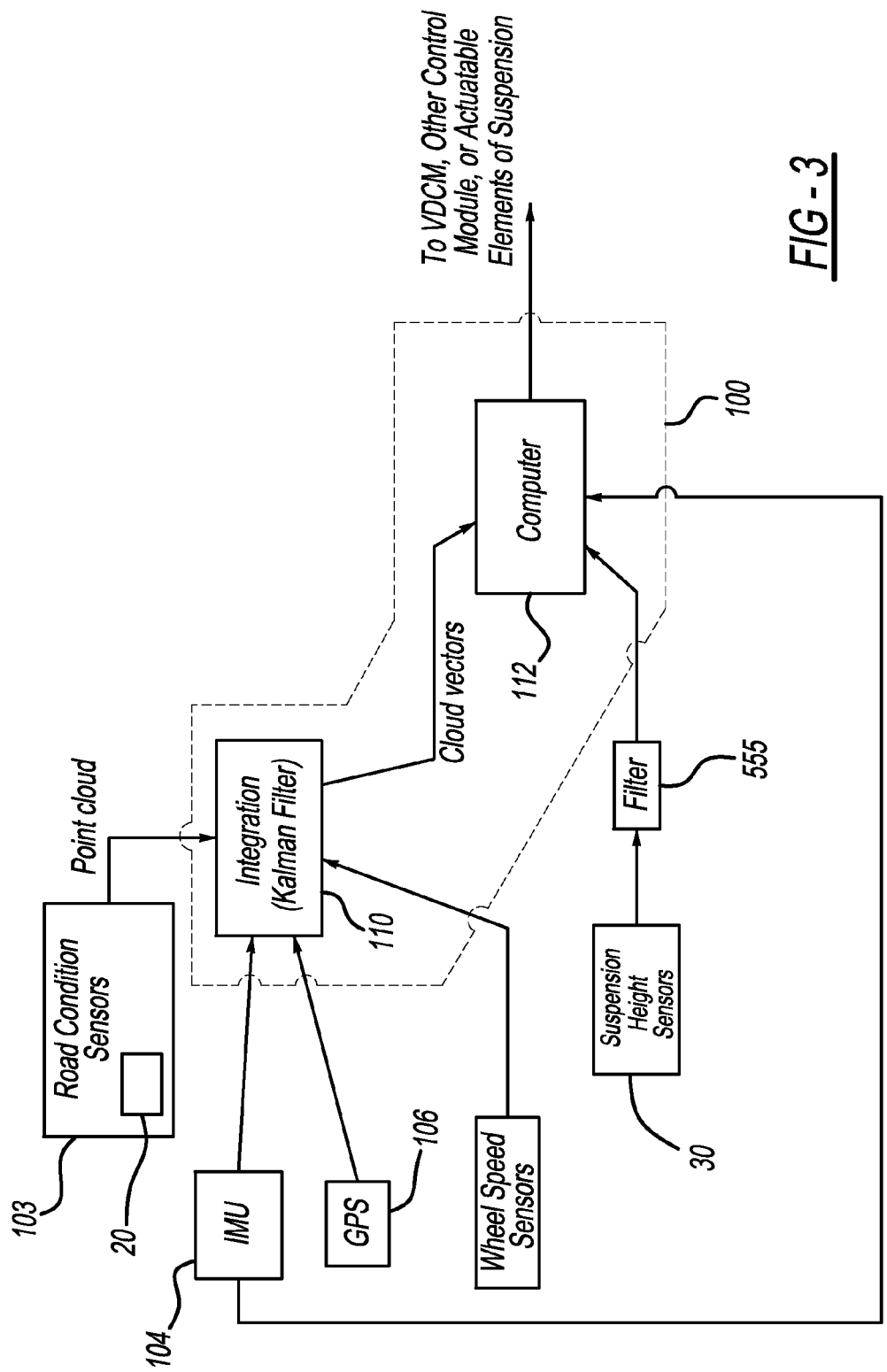
FIG. 3 is a block diagram of an estimator means in accordance with one embodiment of the present invention.

Referring now to FIG. 1 and also to the schematic block-diagram of FIG. 3, embodiments of the vehicle control system described herein incorporate a road surface condition estimator means, generally designated as 100. In one embodiment, an estimator means 100 in accordance with the present invention comprises a micro process 112 and one or more integration means 110 operatively coupled to the micro-processor system and usable for integrating inputs received from various vehicle sensors and/or other systems.

One or more elements of the estimator means may be incorporated into the VDCM 99 or another control module. Alternatively, elements of the estimator means 100 may be incorporated into an estimator module operatively coupled to the VDCM for interaction with the VDCM and/or with other control module(s). Such a module may be configured for incorporation into the control system of a new vehicle during fabrication, or the module may be configured for retrofitting into the control system of an existing vehicle.

In one embodiment, pertinent elements of the estimator means (such as the controller, any pertinent active suspension system components actuatable by the controller, any required sensors, and any other necessary elements) are installed as replacements for existing corresponding passive suspension system components.

In another embodiment, the active suspension components are installed so as to function in parallel with the passive suspension system components. The active suspension components and sensors are coupled to a controller as described for executing the model veneration and suspension control functions. In one particular embodiment, the controller may be configured to exercise active control of the actuatable suspension system elements only when an abnormal road surface condition is encountered. During normal road conditions, the estimator means and its associated active suspension system elements and sensors may remain inactive.

In another embodiment, in an existing active suspension system, a new controller, configured for processing the sensor data and generating control commands responsive to detection of an abnormal road surface condition, may be installed as a replacement for an existing system controller. The new controller may also be configured for controlling the active suspension system under normal road conditions, and for performing the other control functions of the previous controller.

In another embodiment, in an existing active suspension system, a new controller may be operatively coupled to existing sensors and/or actuatable suspension system elements. The new controller would also be adapted to operate in conjunction with an existing controller. Suitable communications and control protocols would be incorporated into one or both controllers enabling the new controller to assume suspension system control when an abnormal road condition is encountered. In all other circumstances, the first controller would perform suspension system control functions.

In sum, in any of the embodiments described above, any sensors, controllers or actuatable suspension system elements necessary for execution of controller commands generated responsive to detection of (and/or contact with) the abnormal road condition may be added onto the vehicle and operatively coupled to existing elements of the vehicle.

Embodiments of the estimator means described herein also incorporate (or utilize data provided by) one or more road condition sensors usable for previewing or surveying the road surface to locate abnormal road conditions (for example, rough patches, potholes, debris, bumps, and other irregularities on the road surface) at a specific set of GPS coordinates ahead of the vehicle, and for estimating various characteristics of the abnormal road surface. For purposes of estimating the road condition, one or more sensors designed to provide data to the estimator means may be added or retrofit to an existing vehicle control system. Alternatively, instead of adding a sensor to the vehicle for the estimator means, data from one or more existing vehicle sensors may be provided to the estimator means for processing.

In one embodiment, the road condition sensors are incorporated into a first sensor means 103. In one particular embodiment, first sensor means 103 includes a known laser scanner 20 incorporated into (or operatively coupled to) road condition sensor suite 102. Scanner 20 is configured for scanning a road surface ahead of the vehicle when the vehicle is moving, in a manner known in the art. Scanner 20 is configured to scan the road surface ahead of the vehicle to gather data usable in a manner described below for generating a point cloud representing an irregularity or abnormality on the road surface (for example, an abnormal level of roughness on the road surface, a pothole, debris, or a bump). The first sensor means 102 may also include additional sensor elements as required for a particular application. In addition, as previously described, the first sensor means 103 may also include individual sensors or groups of associated sensors (such as radar, lidar, laser scan, or vision/camera systems) for detecting various aspects of the vehicle environment.

In a particular embodiment, a second sensor means 104 includes a known or suitable IMU 22 incorporated into the vehicle control system 12 for providing angular velocity and linear acceleration data to the integration means. As is known in the art, the IMU 22 may include sensors configured for detecting the vehicle's roll rate $\gamma$, yaw rate $\psi$, pitch rate longitudinal acceleration, lateral acceleration, and vertical acceleration. The second sensor means 104 may also include additional sensor elements as required for a particular application.

The various sensor means whose inputs are used in detecting the abnormal road condition and in predicting the severity of the condition may also include sensor elements which are incorporated into one of the standard vehicle sensor arrays and/or the elements not normally incorporated into one of the standard vehicle sensor arrays, depending on the particular type(s) of sensor data to be used in generating and refining the road surface model.

If required, additional means (for example, one or more filters or other electronic pre-processing means (not shown)) may be provided for filtering or otherwise pre-processing the signals from any of the sensor means prior to processing by the integration means and/or for pre-processing the signals from the integration means prior to processing by the microprocessor system.

In one embodiment, an integration means 110 is operatively coupled to one or more of the road condition sensors 102 previously described. The integration means 110 is also operatively coupled to the vehicle GPS system 125, to the IMU 22, and to the vehicle wheel speed sensors (generally designated 105).

The integration means 110 interprets the data from the road condition sensors, the GPS system, the wheel speed sensors, and the IMU in a known manner to generate a series of six-dimensional cloud vectors as described below, each vector relating to a corresponding cloud point representing a point on the abnormal road surface. Integration means 110 may be operatively coupled to a computer 112 as shown in FIG. 3. Alternatively, the integration means may be incorporated into the computer 112. In one embodiment, the integration means comprises a filter (for example, a Kalman filter) suitable for performing the required integration. Such a filter is described in [1] Stavens D, Thrun S (2006) *A Self-supervised Terrain Roughness Estimator for Off-road Autonomous Driving, In: Conference on Uncertainty in AI (UAI)*, Cambridge, Mass., the contents of which are incorporated herein by reference.

In one embodiment, computer 112 is incorporated into VDCM 99, as shown in FIG. 1. However, the computer 112 may alternatively be separate from and operatively coupled to the VDCM, as shown in FIG. 3. Computer 112 is operatively coupled to the integration means 110 and (if required) to various sensors of the vehicle sensor array. Computer 112 receives cloud vector information generated by integration means 110 and performs weighting and/or any other processing of cloud vector information and sensor information required for generation of a prediction or estimate of the condition of a portion of abnormal road surface ahead of the vehicle.

The computer 112 is also configured to process sensor data received from the suspension height sensors 30 when the vehicle wheels encounter the abnormal road surface feature previously scanned by the laser scanner. This data is processed in a manner described below to generate a road condition vector $w_{ROAD}$ for use in classifying the abnormal road condition according to a set of predetermined road condition classifications. Responsive to the road condition classification, one or more control commands may be generated to actuatable elements of the active suspension system, for controlling the suspension system responsive to the estimated road surface conditions.

The computer may also include (or be operatively associated with) a memory (not shown) for storing road surface condition information correlated with the GPS position of the stored road surface condition, along with any other required data and/or information.

A computer 112 configured for performing functions related to generation of the abnormal road condition model (including processing and evaluation of sensor data, generation of control commands responsive to abnormal road conditions predicted by the model based on processing of the data, and other model-related functions and functions described herein) may be incorporated into the main vehicle VDCM 99.

Alternatively, the control routines necessary for evaluating the sensor data and generating control commands responsive to the abnormal road conditions may be incorporated into a computer of a separate VDCM which may replace a pre-existing vehicle VDCM.

Alternatively, the computer may be incorporated into a separate VDCM which may be retrofitted to or added on to an existing vehicle, in addition to the pre-existing vehicle VDCM. Such an add-on VDCM may incorporate protocols enabling the new VDCM to interface with the pre-existing VDCM. For example, such protocols provide for and govern control of various actuatable active suspension system elements by the new VDCM rather than the pre-existing vehicle VDCM n the event that an abnormal road condition is encountered. In this case, the new VDCM would assume temporary control of the actuatable suspension system elements deemed necessary to respond to the abnormal road condition to implement the necessary control commands. After the vehicle has passed the abnormal stretch of road, control may then be returned to the pre-existing vehicle VDCM.

In embodiments of the vehicle control system described herein, the actuatable vehicle elements which may be controlled by commands generated responsive to inputs from the estimator means include suspension stiffness adjustment means 210a, suspension height adjustment means 210b, suspension damping adjustment means 210c, anti-roll adjustment means 210d, and any other known or suitable actuatable suspension system components affecting vehicle suspension forces, suspension rattle spaces, the damping components of the suspensions, the stiffness components of the suspensions, the anti-roll components of the suspensions, suspension travel and/or suspension height. Additional vehicle systems or elements may also be configured to actuate responsive to the generated control commands, if desired.

FIG. 4 is a flow diagram illustrating the process flow for one method of generating a model characterizing abnormal road conditions using gathered sensor data, and for generating suspension control commands responsive to the characterized abnormal road conditions. Several terrain learning and estimation methods have been developed to facilitate modeling of terrain roughness. Some examples of such methods are described in the following references: [1] Stavens D, Thrun S (2006) *A Self-supervised Terrain Roughness Estimator for Off-road Autonomous Driving.* In: *Conference on Uncertainty in AI (UAI)*, Cambridge, Mass.; [2] Brooks C A, Iagnemma K D (2007) *Self-Supervised Classification for Planetary Rover Terrain Sensing.* In: *2007 IEEE Aerospace Conference*, IEEE, Big Sky, Mont.; and [3] Katz R. Nieto J, Nebot E (2008) *Probabilistic Scheme for Laser Based Motion Detection,* In: *IEEE/RSJ international Conference on Intelligent Robots and Systems,* IEEE, Nice, France, pp 161-166. The teachings of these references are incorporated herein by reference.

As previously described, one embodiment of the road condition sensor array 102 includes a laser scanner 20 for scanning road surfaces ahead of the vehicle to obtain road surface data.

In step 300, following the approach described in reference [1], the road surface ahead of the vehicle is previewed by laser scanning as the vehicle moves. This provides data used to generate a "preview" or estimate of the road condition ahead of the vehicle. In one embodiment, the laser scanner used is capable of acquiring range data for 100-200 angular positions at 50-100 Hz with 0.5 degree angular resolution. For this embodiment, a scanner is selected that is operable or configurable to operate at least within these parameters. In addition, additional data in the form of estimated GPS coordinates of the scanned road feature is gathered by GPS system 106. Also, vehicle roll, pitch and yaw data is obtained from the vehicle inertial sensors of the IMU at the time at which the abnormal road feature is scanned, and data from the vehicle wheel speed sensors is gathered at the time at which the abnormal road feature is scanned. Data from these various sources is gathered simultaneously so that the laser scan data, IMU data, GPS coordinate estimates and wheel speed data can be time-correlated.

In step 308, following the approach described in reference [1], integration means 110 is used to integrate the laser scan cloud point data for each measured point on the abnormal road surface with the estimated GPS location data relating to that point, the time derivatives of the vehicle roll and pitch rates as estimated from IMU data, and the wheel speed sensor data. Using the gathered data, the integration means generates a series of six-dimensional cloud vectors L, each vector relating to a corresponding measured cloud point. Each vector $L_i$ includes the following elements:

$$L_i = [x, y, z, d\gamma, d\psi, t] \qquad (1)$$

where t is the time of measurement of the x, y, and z coordinates of a given cloud point, and also the time of measurement of $\gamma$ and $\psi$; $d\gamma$ is the first derivative of the vehicle's roll rate $\gamma$ at the time of measurement t, as determined from IMU data; $d\psi$ is the first derivative of vehicle's estimated pitch rate $\psi$ at the time of measurement t, as determined from IMU data; and x, y, and z are estimated GPS position coordinates of the given cloud point at the time of measurement i. Thus, the aggregation of cloud vectors provides a representation of the shape and dimensions of the road surface and features thereof as measured at time t. The results of the integration are passed to computer 112.

The method described in Reference [1] uses measures shock values to learn the values of unknown parameters $p_i$'s for improving the accuracy of the road surface classification. The method of Reference [1] only provides a classification of road roughness. It does not process suspension height sensor measurements as described herein with regard to the embodiments of the present invention, and does not predict or preview the road condition ahead of the vehicle as described herein. In the embodiments of the present invention, an alternative sensor fusion approach is used. This approach uses the laser cloud data in combination with the suspension height sensor measurements to generate and refine a model usable for predicting or estimating the road surface ahead of the vehicle. Road surface condition estimates derived from this model may then be used to control the vehicle active suspension system prior to contact between the vehicle and any abnormal road surface features revealed by the laser scans, for mitigating the effects of such contact on the vehicle and its occupants.

In step 309, a temporal occupancy grid is generated.

Figure 5A:
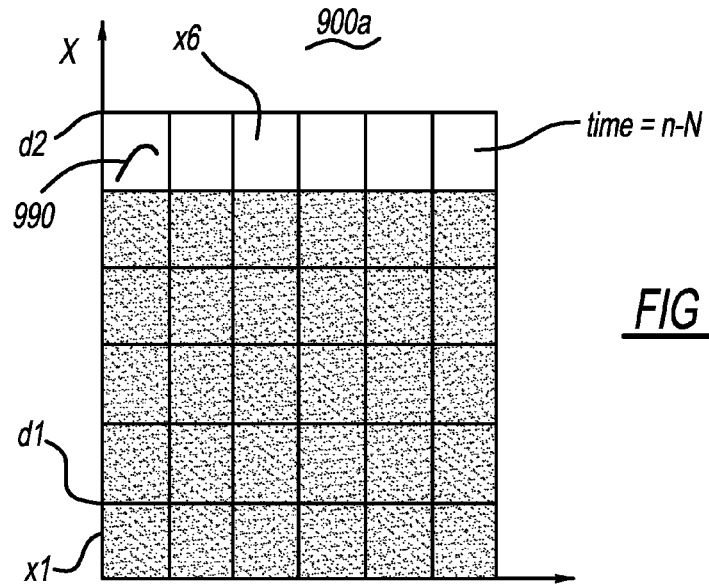
FIG. 5A shows an example of a temporal occupancy grid generated by the road surface condition estimating means in accordance with one embodiment of the present invention, when an abnormal road surface feature is relatively farther from the vehicle.
Figure 5B:
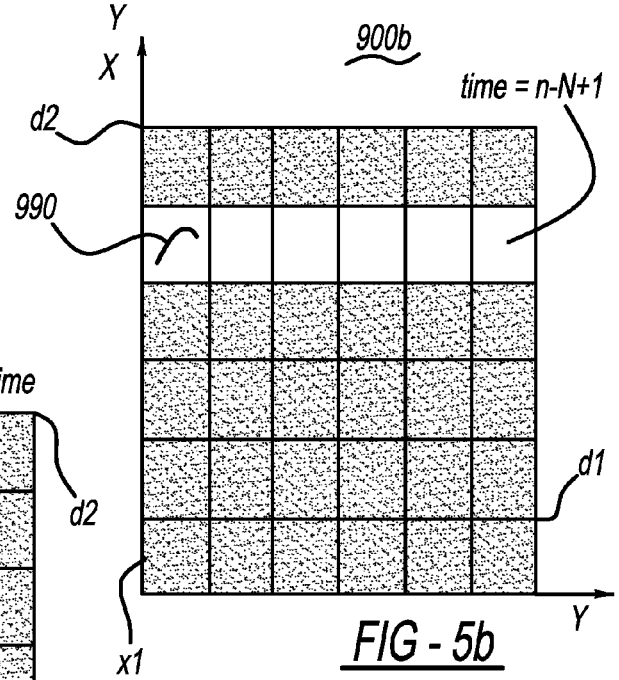
FIG. 5B shows an example of a temporal occupancy grid generated by the road surface condition estimating means in accordance with the embodiment represented in FIG. 5A, when the abnormal road surface feature is closer to the vehicle than in FIG. 5A.
Figure 5C:
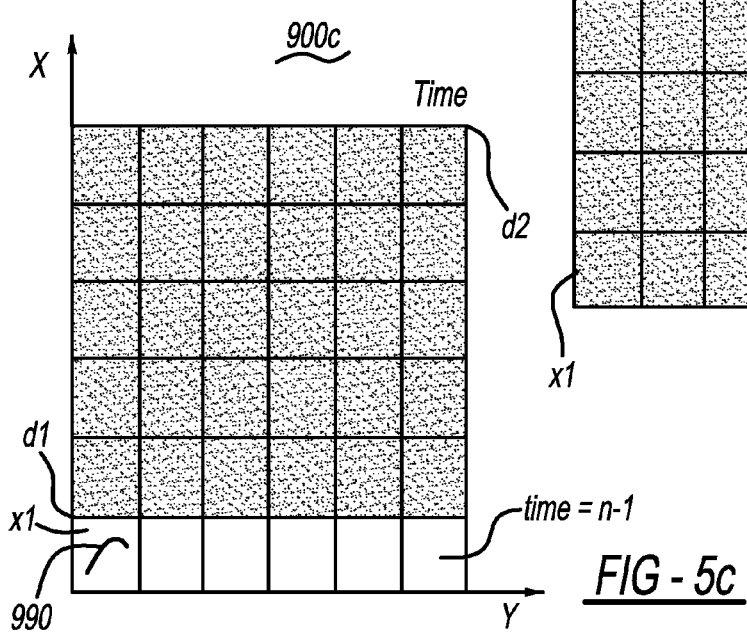
FIG. 5C shows an example of a temporal occupancy grid generated by the road surface condition estimating means in accordance with the embodiment represented in FIG. 5A, when the abnormal road surface feature is closer to the vehicle than in FIG. 5B.

The method used for estimating or modeling the abnormal road surface feature in accordance with embodiments of the present invention is based on the use of a temporal occupancy grid, successive iterations of which are designated as 900a-900c in FIGS. 5A-5C. Referring to FIGS. 5A-5C, a temporal occupancy grid is imposed on the laser cloud. The grid includes representations of scanned road features residing within a fixed distance in front of the vehicle (for example, road feature 990). The grid moves with the vehicle and the cloud, and is continuously updated with every new laser scan. Thus, as the grid moves with the vehicle and the cloud toward any abnormal road feature (for example, abnormal road feature 990) identified by the scans, and as the grid is continuously updated with every new laser scan, the static abnormal road feature 990 gets closer to the vehicle.

Grid references x1 includes representations of road features relatively closer to the vehicle (out to a distance of d1 from the vehicle), while grid references x6 include representations of road features relatively farther from the vehicle (out to a distance of d2 from the vehicle). FIG. 5A shows the representation of feature 990 when the feature is n–N time periods away from physical contact with a vehicle wheel. The progression in resolution of the abnormal road surface feature 990 at successive time intervals (n–N), (n–N+1), . . . , (n–1) as the moving vehicle approaches the road surface feature is shown in FIGS. 5A-5C, where FIG. 5A shows an embodiment 900a of the grid when the abnormal road surface feature 990 is relatively farther from the vehicle (at time n–N), FIG. 5B shows an embodiment 900b of the grid (at time n–N+1) when the abnormal road feature is closer to the vehicle than in FIG. 5A, and FIG. 5C shows an embodiment 900c of the grid (at time n–1) when the abnormal road feature is closer to the vehicle than in FIG. 5C.

With the passage of time and every update of the cloud by successive scans, the vehicle draws closer to the abnormal road surface feature, the characteristics of the feature become more clearly defined and the uncertainty relating to the cloud vector representation of the feature is reduced. As the vehicle moves toward the abnormal road feature, the object moves along the x axis of the grid relative to the vehicle, and the cloud vectors are continually updated. At the $n^{th}$ time instant the estimate of the abnormal road surface feature characteristics according to the cloud vectors should coincide with measurements of corresponding characteristics of the feature obtainable by the sensor data, from physical contact between the sensors and the road feature.

Figure 6:
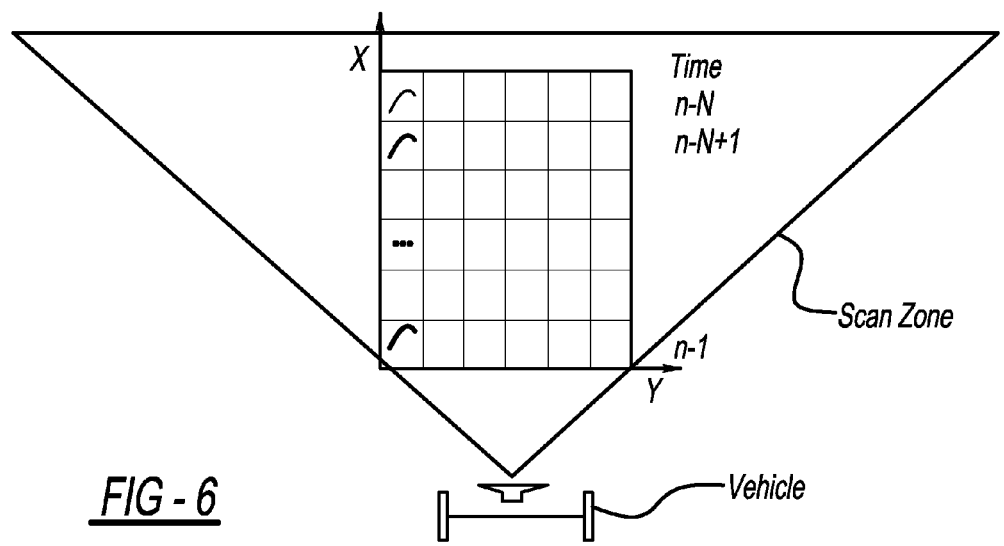
FIG. 6 is a representative example of a composite temporal occupancy grid generated in accordance with one embodiment of the present invention.

FIG. 6 shows (in a single view) the time-lapse progression of FIGS. 5A-5C as the vehicle approaches the feature 990, and as the representation of the road feature 990 becomes more and more distinct and accurate. At the same time, and in a similar manner, as the vehicle approaches abnormal road features located father from the vehicle than feature 990, the representations of these road features become more and more distinct and accurate.

In step 310, cloud vectors usable for a baseline or reference (i.e., normal) road surface representation are identified.

In order to identify a change of the road height ahead of the vehicle a 3D grid is imposed on the (x, y, z) laser cloud of eligible 6D vectors, in accordance with the following relationship:

$$E=[x, y, z, \text{roll rate } \gamma, \text{pitch rate } \psi, \text{time of measurement } t]$$

The eligible vectors E are those that are obtained during normal driving (i.e. vectors having relatively lower pitch rate and roll rate components, and excluding roll and pitch rate data acquired during relatively severe or violent dynamic maneuvers, which produce relatively high absolute values of $\gamma$ and $\psi$). The eligible vectors E satisfy the relationship:

$$E=\{L: (\gamma^2+\psi^2)<\|\delta\|\} \quad (1A)$$

where $\delta$ is a predetermined threshold value dependent upon certain driving conditions. For example, one factor affecting the quantity $\delta$ is vehicle speed; the higher the speed, the larger the value of $\delta$. $\delta$ can be defined as a function of velocity according to the relation:

$$\delta=a+bV$$

where a and b are two calibrated parameters. These criteria help distinguish the baseline or normal road surfaces from the abnormal road surface features.

Eligible vectors E may be determined from the same scans of the road ahead of the vehicle which provide information relating to the abnormal road portions. Alternatively, eligible vectors E may be obtained from stored or previously acquired information relating to the road surface at the given GPS location. In yet another embodiment, the eligible vectors E are provided by another vehicle which has previously traversed the portion of road at the given GPS location.

In step 312, a probability density function (PDF) is computed for the road portion represented in the temporal occupancy grid. The probability density function is used in calculating and estimated road surface height at each location x,y within the temporal occupancy grid.

Referring to FIG. 7, the third dimension of the grid is defined by the range of z-axis measurements of the laser scanner. For simplicity of notation assume a uniformly partitioned N by N by N grid with intervals centered at the cloud points $(x_{oi}, y_{oj}, z_{ok})$. Each cell of the grid is defined by the triple $(x_i, y_j, z_k)$, $i, j, k=\{1, N\}$. A probability density function (PDF) of the abnormal road portion height predicted at a time n–N (i.e., at n–N time periods before a vehicle wheel physically contacts the abnormal road feature 990 and the resultant suspension height sensor measurements are acquired) is calculated from the number or frequency S of the cloud points in each of cells $(x_i, y_j, z_1)$, $(x_i, y_j, z_2)$, . . . , $(x_i, y_j, z_M)$ as represented in FIG. 8. The probability density function $P_{ijk}$ can be determined using the following relation:

$$P_{ijk}(n-N)=S_{ijk}(n-N)/\Sigma_k S_{ijk}(n-N) \quad (2)$$

Also in step 312 or at some other point prior to entering the loop defined by steps 314 through 322, a series of correction factors $C_i$, $i=\{1, N\}$ are initialized at a common non-zero reference value. The correction factors are then updated as described below responsive to contact between the abnormal road surface and the vehicle wheels. The correction factors are applied to the road height estimates $H_{ij}(n-N)$ previously generated from the laser scan data to produce revised estimated road height estimates.

In step 314, the estimated road surface height at each location x,y within the temporal occupancy grid is calculated. The height $H_{ij}$ of the road at a given location $(x_i, y_i)$ is estimated by the relation:

$$H_{ij}(n-N)=\Sigma_k P_{ijk}(n-N)z_{ok}$$

In step 316, when the vehicle encounters the scanned road feature (after passage of time period n–1 as shown in FIG. 6) and the wheels interact with the abnormal road feature, data from vehicle sensors (such as the suspension height sensors) is passed through filter 555 and then to computer 112 for processing. In the manner described below, the filtered data is processed to calculate a value for a road condition vector $w_{ROAD}$ indicative of an actual road condition at the previously scanned location.

In this respect, the portion(s) of the active suspension system contacting the abnormal road surface feature act as additional sensors which provide information usable for calculating parameters (such as road profile sector $w_{ROAD}$) which can be used to control the active suspension responsive to the abnormal road conditions.

In step 320, the estimated heights $h_{wl}'$ and $h_{wr}'$ of the road surface at the left and right front wheels, respectively, are calculated using the estimated road surface heights H and the latest values of the correction factors C.

The revised estimated heights $h_{wl}$ and $h_{wr}$ of the road surface at the left and right front wheels, respectively, at a given location $(x_i, y_i)$ may be obtained by interpolating between the grid centers $y_{oj}$ using inverse distances, and applying correction factors $C_i$ to the previously calculated corresponding road height estimates:

$$h_{wl}'(n-N) = \Sigma_i \{C_i H_{iN}(n-N)|y_{oi}-y_{wl}|^{-1}\}/\Sigma_i |y_{oi}-y_{wl}|^{-1} \quad (4)$$

$$h_{w4}'(n-N) = \Sigma_i \{C_i H_{iN}(n-N)|y_{oi}-y_{wr}|^{-1}\}/\Sigma_i |y_{oi}-y_{wr}|^{-1}. \quad (5)$$

In step 322, the correction factors are updated. Correction factors $C_i$, $i=\{1, N\}$, are continuously updated using a structured learning method. The learning method updates the correction factors $C_i$, $i=\{1, N\}$ by comparing the road surface heights $h_{wl}'$ and $h_{wr}'$ $$h_{wl}'(n) = \Sigma_i \{C_i H_{il}(n)|y_{oi}-y_{wl}|^{-1}\}/\Sigma_i |y_{oi}-y_{wl}|^{-1} \quad (6)$$

$$h_{wr}'(n) = \Sigma_i \{C_i H_{il}(n)|y_{oi}-y_{wr}|^{-1}\}/\Sigma_i |y_{oi}-y_{wr}|^{-1} \quad (7)$$

as estimated from the laser cloud to the actual measured road surface heights $h_{wl}(n)$ and $h_{wr}(n)$ at the same location where:

$$H_{ij}(n) = \Sigma_k P_{ijk}(n) z_{ok}, \quad (8)$$

as given by the relationship described above with respect to step 314.

The probabilities $P_{ijk}(n)$ in relation (8) are calculated from the linearly weighted frequencies $S_{ijk}(n-N)$, $S_{ijk}(n-N+1)$, ..., $S_{ijk}(n-1)$:

$$P_{ijk}(n) = S_{ijk}(n)/\Sigma_k(S_{ijk}(n))$$

$$S_{ijk}(n) = w_N S_{ijk}(n-N) + w_{N-1} S_{ijk}(n-N+1) + \ldots + w_1 S_{ijk}(n-1)$$

where i, j, k = $\{1, N\}$ and weights $w_1, w_2, \ldots, w_N$ are linearly monotonically decreasing to reflect the approximately linear dependence of the error of the cloud estimated height on time, as described in Reference [1].

Finally the correction factors are updated by applying the Least Mean Square (LMS) algorithm to a cost function minimizing the error between the road surface height predicted by the cloud-based estimate and the road surface height actually measured height at wheels:

$$J(n) = (\Sigma_i \{C_i H_{il}(n)|y_{oi}-y_{wl}|^{-1}\}/\Sigma_i |y_{oi}-y_{wl}|^{-1} - h_{wl}(n))^2 + (\Sigma_i \{C_i H_{il}(n)|y_{oi}-y_{wr}|^{-1}\}/\Sigma_i |y_{oi}-y_{wr}|^{-1} - h_{wr}(n))^2 \quad (11)$$

This procedure yields the following recursion for the vector of correction factors C(n):

$$C(n-1) = C(n) + \alpha(h_{wl}(n)) - C^T(n) d_l(n)) d_l^T(n)/(d_l^T(n) d_l(n)) \quad (12)$$

$$C(n-1) = C(n) + \alpha(h_{wr}(n)) - C^T(n) d_r(n)) d_r^T(n)/(d_r^T(n) d_r(n)) \quad (13)$$

where $$d_{il}(n) = H_{il}(n)|y_{oi}-y_{wl}|^{-1}/\Sigma_i |y_{oi}-y_{wl}|^{-1} - h_{wl}(n)$$

$$d_{ir}(n) = H_{il}(n)|y_{oi}-y_{wl}|^{-1}/\Sigma_i |y_{oi}-y_{wl}|^{-1} - h_{wr}(n)$$

and $\alpha$ is a forgetting factor which gives exponentially less weight to previous, older estimated road surface heights h, J(n) is the cost function, and, $d_i^T$ is a transpose operation of an associated vector.

The latest (i.e., most recently updated) correction factors are fed back to step 314 to be applied as described above during processing of data relating to any new abnormal road feature encountered during movement of the vehicle. Constant updating of the correction factors applied to the scan data improves the accuracy of the model as more and more data are collected from interactions between the vehicle suspension and various abnormal road surface features.

In the manner described above, a method is provided for accurately estimating characteristics of the abnormal road surface feature based on laser scan data, GPS coordinate data, IMU data, and wheel speed sensor data, without the need for vehicle interaction with the road feature. As additional abnormal road surface features are encountered, through repeated correlation of the laser scan data with the road sensor contact data, the values of the correction factors C can be refined or tuned. This increases the accuracy and reliability of the road surface condition estimates derived from the laser scans. Eventually, the accuracy of the predictive system road is such that road conditions are predicted and classified by the estimator using laser scan, GPS coordinate, IMU, and wheel speed sensor data alone, and control of the suspension may be based solely on the road condition as predicted by the estimator.

In step 318, when data has been gathered from interaction between the suspension and the abnormal road surface feature, a road profile vector $w_{ROAD}$ is calculated.

In the manner described below and for another operational mode, the computer 112 is also configured to calculate, based on processing of the suspension height sensor data in a manner described below and using the known values of various parameters, a value for the road profile vector $w_{ROAD}$ which reflects the condition of the abnormal road surface feature previously scanned by the laser scanner. The road profile vector $w_{ROAD}$ is a representation of the vertical deviation of the abnormal road surface from the smooth road surface.

Referring to FIG. 3, in a first step, data from the vehicle height sensors 30 is transmitted to a suitable filter 555 as the suspension interacts with the abnormal road surface. In addition, data from IMU 104 relating to body roll $\gamma$ and body pitch $\psi$ resulting from contact between the vehicle wheels and the abnormal road feature is provided to computer 112.

In the next step, a body heave h is measured or calculated The body heave h is defined as the displacement of the center of gravity of the vehicle resulting from contact of the vehicle wheels with the abnormal road feature. Also, in step 312a, the body roll $\gamma$ resulting from contact of the vehicle wheels with the abnormal road feature is gathered, and the body pitch $\psi$ resulting from contact of the vehicle wheels with the abnormal road feature is gathered. The parameter h can be measured or calculated in a known manner from the vehicle height sensor data generated as the wheel encounters the actual physical road abnormality, and from the location of the vehicle center of gravity. The parameters $\gamma$ and $\psi$ can be gathered from the IMU.

In the next step, the body heave h, the body pitch $\psi$, and the body roll $\gamma$ are used to define a body state vector q:

$$q = \begin{bmatrix} h \\ \gamma \\ \psi \end{bmatrix}$$

In the next step, an absolute wheel vertical displacement vector $z_w$ is determined. The component of this vector is a wheel's vertical displacement resulting from contact with the abnormal road surface feature. This can be measured or calculated in a known manner from the suspension height sensor data generated as the wheel encounters the actual physical road abnormality.

In the next step, a suspension height measurement vector $z_{rp}$ is determined. The component of this vector is the relative position difference between the two ends of the suspension at each wheel. The vector $z_{rp}$ can be computed from an absolute wheel vertical displacement vector $z_w$ and the body state vector q.

Generally, the suspension height measurement vector $z_{rp}$ can be expressed as a linear function of the body motion and wheel motions by the following relation:

$$z_{rp} = H_1 q - H_2 z_w \qquad (4)$$

where $H_1$ is a 4×3 matrix and $H_2$ is a 4×4 matrix which can be determined in a known manner from the suspension geometry and the motion ratios of a particular suspension system.

The $i^{th}$ component of $z_w$ is the vertical displacement of the center of the $i^{th}$ wheel/tire assembly. The wheel motions are seen at the wheel, suspension height changes are seen along the suspension directions which are dynamically varying during motion of the vehicle, and body motions are seen at the directions defined on the body. The elements of the vehicle experiencing these motions are connected in a known manner via linkages. Hence the relationships between these motions may involve scaling factors and orientation angles in a dynamic fashion.

Basically, the effect of the suspension on vehicle motion depends on the ratios of spring displacement to the wheel displacement and spring damper velocity to the wheel velocity. These ratios are known as "motion ratios" or "installation ratios". Since the orientations or axes along which the suspensions act may vary with movement of the suspension components, the aforementioned "motion ratio" or "installation ratios" are usually not constant. This phenomenon is explained in greater detail by John Dixon, in "*Suspension Geometry and Computation*", published by John Wiley and Son Ltd., 2009, which is incorporated herein by reference.

Referring to FIG. 9, the suspension height measurement vector $z_{rp}$ for a quarter ear model of a vehicle with a strut suspension can be calculated using the following relationship:

$$z_{rpi} = \frac{l}{m \cos(\theta_i)} h_i - \frac{z_{wi}}{\cos(\theta_i)}$$

where l is the distance from the vehicle center of gravity to the rotational center of the wheel/tire assembly, m is the distance from the vehicle center of gravity to where the suspension axis intersecting with the axle of the wheel and θ is the angle between the direction of suspension travel responsive to contact with the abnormal road feature and the direction of motion of the center of the wheel/tire assembly responsive to contact with the abnormal road feature.

$z_{rp}$ can also be measured in a manner known in the art using relative position sensors mounted on the left-front, right-front, left-rear and right-rear corners of the suspension. Inputs from these sensors can be incorporated into a representative matrix as follows:

$$z_{rp} = \begin{bmatrix} z_{rp1} \\ z_{rp2} \\ z_{rp3} \\ z_{rp4} \end{bmatrix}$$

The passive suspension spring force $f_s$ is a function of the relative travel of the two ends of the spring, which can be computed in a known manner from the measured value of $z_{rp}$ in conjunction with certain linkage ratios.

For example, $f_s = K z_{rp}$ for linear suspensions where K is a gain matrix. The generic passive suspension spring force $f_s$ can be expressed by the following relationship:

$$f_s = \begin{bmatrix} f_{s1}(L_{s1} z_{rp}) \\ f_{s2}(L_{s2} z_{rp}) \\ f_{s3}(L_{s3} z_{rp}) \\ f_{s4}(L_{s4} z_{rp}) \end{bmatrix} \equiv f_s(L_s z_{rp})$$

where $L_s$ is the matrix determined from the geometry of the suspension including motion ratios.

As known in the art, the passive suspension damper force $f_d$ is a function of the relative velocities of the opposite ends of the damper, which can also be determined from the measured value of vector $z_{rp}$ and can be expressed as:

$$f_d = \begin{bmatrix} f_{d1}(L_{d1} \dot{z}_{rp}) \\ f_{d2}(L_{d2} \dot{z}_{rp}) \\ f_{d3}(L_{d3} \dot{z}_{rp}) \\ f_{d4}(L_{d4} \dot{z}_{rp}) \end{bmatrix} \equiv f_d(L_d \dot{z}_{rp})$$

where $L_{si}$ and $L_{di}$ are the corresponding parameters which capture the motion ratios for the $i^{th}$ wheel and i=1, 2, 3, 4.

A model characterizing the vertical ride dynamics of the vehicle body can thus be expressed by the relation:

$$M_{bdy} \ddot{q} = -V_s f_s - V_d f_d + F$$

where $M_{bdy}$ defines an inertia matrix of vehicle body which incorporates the sprung mass and the roll and pitch moments of inertia:

$$M_{bdy} = \begin{bmatrix} M_s & & \\ & I_{xx} & \\ & & I_{yy} \end{bmatrix},$$

$$V_s = \begin{bmatrix} 1 & 1 & 1 & 1 \\ -l_{sylf} & l_{syrf} & -l_{sylr} & l_{syrr} \\ l_{sxf} & l_{sxf} & -l_{sxr} & -l_{sxr} \end{bmatrix},$$

$$V_d = \begin{bmatrix} 1 & 1 & 1 & 1 \\ -l_{dylf} & l_{dyrf} & -l_{dylr} & l_{dyrr} \\ l_{dxf} & l_{dxf} & -l_{dxr} & -l_{dxr} \end{bmatrix}$$

where F defines an active u, pension force vector whose elements are the suspension forces at the wheels, where $V_s$ is a matrix whose elements are related to the distances of the suspension springs from the vehicle body. Also, $V_d$ is a matrix whose elements are related to distances of the suspension dampers from the vehicle body.

In one embodiment, $M_s$ is the sprung as (vehicle's body mass), $I_{xx}$ is the vehicle body's roll moment of intertia and $I_{yy}$ is the vehicle body's pitch moment of inertia; $l_{sylf}, l_{syrf}, l_{sylr}, l_{syrr}$ are the lateral or perpendicular distances from the left-front, right-front, left-rear, and longitudinal center line of the vehicle; $l_{sxlf}, l_{sxrf}, l_{sxlr}, l_{sxrr}$ are the longitudinal distances from the left-front, right-front, left-rear, and right rear, suspensions to the center of gravity of the vehicle. The tire/wheel assemblies obey the following equation of motion incorporated into independent, nonlinear suspensions:

$$M_w \ddot{z}_w = f_s(L_s z_{rp}) + f_d(L_d \dot{z}_{rp}) - F - K_t z_{td} - C_t \dot{z}_{td}$$

where $C_t$ is the damping coefficient of the tire, $K_t$ is the tire stiffness and $z_{td}$ is a tire deflection vector whose elements are the tire deflections as the wheels.

An absolute wheel displacement vector $z_w$ can be computed for a given body state vector q and a given suspension height measurement vector $z_{rp}$:

$$z_w = H_2^{-1}(H_1 q - z_{rp})$$

and a variable $w_{ROAD}$ representing the road profile can now be calculated as:

$$\ddot{q} = -M_{bdy}^{-1}[V f_s + V_d f_d - F]$$

$$z_{td} = (K_t + C_t s)^{-1}[f_s + f_d - F - M_w H_2^{-1} H_1 q + M_w H_2^{-1} z_{rp}]$$

$$w_{ROAD} = H_2^{-1} H_1 q - H_2^{-1} z_{rp} + z_{td}$$

A filtered value of the quantity $w_{ROAD}$ is used to characterize the abnormal road surface portion being examined. The quantity $w_{ROAD}$ represents the maximum height of the abnormal road surface feature above the normal road surface. In one embodiment, $w_{ROAD}$ is measured in meters. However, any other suitable unit of measure may be used. In the aggregate, the collection of data points measured along the outer surface of the road feature provides a three-dimensional profile of the road feature.

The calculated value of $w_{ROAD}$ at a given location may be saved to a memory along with data (for example, GPS coordinates) identifying the location of the abnormal road feature. In step 319, and in the manner described below, this information may be used in classifying the abnormal road surface into one of several predetermined general road types.

In one embodiment of the classification scheme, the abnormal or irregular road conditions can be characterized as one of the following types, based comparisons of the dimensions of the abnormality or irregularity with various vehicle-related dimensions, such as the track width, wheel base, ground clearance and any other pertinent dimensions. For the purposes described herein, a vehicle's track width is defined as the distance between the center lines of each of the two wheels on the same axle on any given vehicle.

TABLE 1

| Abnormal Road Type | Definition | No. of Wheels in Contact | Degree of Severity |
|---|---|---|---|
| Type 1: Debris | Objects abandoned on the roadway. The objects have width less than the vehicle track width and height less than the vehicle's ground clearance | 1 | Small Medium Large |
| Type 2: Bump | Bump with width greater than the vehicle's track width (e.g., a speed bump) and with height less than the vehicle's ground clearance | 2 | Small Medium Large |
| Type 3: Pothole | Drop on the roadway that has width less than the vehicle's track width and height less than the vehicle's ground clearance | 1 | Small Medium Large |
| Type 4: Drop/Elevation | Drop on the roadway with width greater than the vehicle's track width (front or rear axle) or with length greater than the vehicle's base (left or right side) and with height less than the vehicle's ground clearance. Elevation on the roadway with width greater than the vehicle's track width (front or rear axle) or with length greater than the vehicle's base (left or right side) and with height less than the vehicle's ground clearance. | 2 | Small Medium Large |
| Type 5: Rough Road | Small road undulations such as those shown in unpaved road, gravel, etc. | 4 | Small Medium Large |
| Type 6: Off-road | Large road undulations or road filled with large rocks, stones, dirt, etc., that have heights close to the vehicle's ground clearance | 4 | Small Medium Large |
| Type 7: Obstacle | Large objects on the roadway which has height greater than the vehicle's ground clearance. | 0 | Small Medium Large |

If both the estimated road surface conditions derived from the laser scan-based road "preview" and the reactive road type characterization derived from any previous interactions between the abnormal road feature and the vehicle active suspension system indicate that road conditions ahead of the vehicle are abnormal, the GPS position coordinates ($X_i$, $Y_i$, $Z_i$) of the abnormality and the current GPS time $t_i$ may be recorded together with the quantitative information about the abnormal condition, where $i \in \{1, 2, \ldots, N\}$ and N is the total number of abnormal road conditions to be tracked. In the manner described below, this information may be used to formulate a digital map showing the locations of abnormal road features encountered by the vehicle.

For each of the abnormal road types shown in Table 1, the severity of the road abnormality may be denoted by the following structured variable as:

$T_{map}(X_i, Y_i, Z_i)$.severity $T_{est}(x, y, z)$.severity $T(x, y, z)$.severity In another embodiment, data from interactions between the abnormal road feature and one or more front wheels is averaged with data from interactions between the abnormal road feature and one or more associated rear wheels to generate a composite or average road condition estimate.

The computer system may be configured for generating and updating such a digital map. In one particular embodiment, the digital map comprises a compilation of road conditions or road states at specified locations along the length of the road. The digital model also includes GPS coordinates associated with each stored road condition. The digital model may also include quantitative measures of the severities of the abnormal road conditions. An example of the abnormal road digital map can be summarized as in the following table:

TABLE 2

Abnormal Road Digital Map

| Abnormal Road Type | Degree of Severity | GPS Locations |
|---|---|---|
| $T_{map}(X_i, Y_i, Z_i) = 1$ Debris | $T_{map}(X_i, Y_i, Z_i)$, severity = 1: Small | $(X_{di}, Y_{di}, Z_{di})$, $i = 1, \ldots, n_{ds}$ |
| | $T_{map}(X_i, Y_i, Z_i)$, severity = 2: Medium | $(X_{dj}, Y_{dj}, Z_{dj})$, $j = 1, \ldots, n_{dm}$ |
| | $T_{map}(X_i, Y_i, Z_i)$, severity = 3: Large | $(X_{dk}, Y_{dk}, Z_{dk})$, $k = 1, \ldots, n_{dl}$ |
| $T_{map}(X_i, Y_i, Z_i) = 2$ Bump | $T_{map}(X_i, Y_i, Z_i)$, severity = 1: Small | $(X_{bi}, Y_{bi}, Z_{bi})$, $i = 1, \ldots, n_{bs}$ |
| | $T_{map}(X_i, Y_i, Z_i)$, severity = 2: Medium | $(X_{bj}, Y_{bj}, Z_{bj})$, $j = 1, \ldots, n_{bm}$ |
| | $T_{map}(X_i, Y_i, Z_i)$, severity = 3: Large | $(X_{bk}, Y_{bk}, Z_{bk})$, $k = 1, \ldots, n_{bl}$ |
| $T_{map}(X_i, Y_i, Z_i) = 3$ Pothole | $T_{map}(X_i, Y_i, Z_i)$, severity = 1: Small | $(X_{pi}, Y_{pi}, Z_{pi})$, $i = 1, \ldots, n_{ps}$ |
| | $T_{map}(X_i, Y_i, Z_i)$, severity = 2: Medium | $(X_{pj}, Y_{pj}, Z_{pj})$, $j = 1, \ldots, n_{pm}$ |
| | $T_{map}(X_i, Y_i, Z_i)$, severity = 3: Large | $(X_{pk}, Y_{pk}, Z_{pk})$, $k = 1, \ldots, n_{pl}$ |
| $T_{map}(X_i, Y_i, Z_i) = 4$ Drop | $T_{map}(X_i, Y_i, Z_i)$, severity = 1: Small | $(X_{dropi}, Y_{dropi}, Z_{dropi})$, $i = 1, \ldots, n_{drops}$ |
| | $T_{map}(X_i, Y_i, Z_i)$, severity = 2: Medium | $(X_{dropj}, Y_{dropj}, Z_{dropj})$, $j = 1, \ldots, n_{dropm}$ |
| | $T_{map}(X_i, Y_i, Z_i)$, severity = 3: Large | $(X_{dropk}, Y_{dropk}, Z_{dropk})$, $k = 1, \ldots, n_{dropl}$ |
| $T_{map}(X_i, Y_i, Z_i) = 5$ Rough Road | $T_{map}(X_i, Y_i, Z_i)$, severity = 1: Small | $(X_{ri}, Y_{ri}, Z_{ri})$, $i = 1, \ldots, n_{rs}$ |
| | $T_{map}(X_i, Y_i, Z_i)$, severity = 2: Medium | $(X_{rj}, Y_{rj}, Z_{rj})$, $j = 1, \ldots, n_{rm}$ |
| | $T_{map}(X_i, Y_i, Z_i)$, severity = 3: Large | $(X_{rk}, Y_{rk}, Z_{rk})$, $k = 1, \ldots, n_{rl}$ |
| $T_{map}(X_i, Y_i, Z_i) = 6$ Off-road | $T_{map}(X_i, Y_i, Z_i)$, severity = 1: Small | $(X_{oi}, Y_{oi}, Z_{oi})$, $i = 1, \ldots, n_{os}$ |
| | $T_{map}(X_i, Y_i, Z_i)$, severity = 2: Medium | $(X_{oj}, Y_{oj}, Z_{oj})$, $j = 1, \ldots, n_{om}$ |
| | $T_{map}(X_i, Y_i, Z_i)$, severity = 3: Large | $(X_{ok}, Y_{ok}, Z_{ok})$, $k = 1, \ldots, n_{ol}$ |
| $T_{map}(X_i, Y_i, Z_i) = 7$ Obstacle | $T_{map}(X_i, Y_i, Z_i)$, severity = 1: Small | $(X_{obi}, Y_{obi}, Z_{obi})$, $i = 1, \ldots, n_{obs}$ |
| | $T_{map}(X_i, Y_i, Z_i)$, severity = 2: Medium | $(X_{obj}, Y_{obj}, Z_{obj})$, $j = 1, \ldots, n_{obm}$ |
| | $T_{map}(X_i, Y_i, Z_i)$, severity = 3: Large | $(X_{obk}, Y_{obk}, Z_{obk})$, $k = 1, \ldots, n_{obl}$ | and the level of severity of the abnormality is defined as either a small abnormality, medium abnormality, or a large abnormality. These levels of abnormality for the road can be, for example, related to the dimensions of the abnormality and/or the dimensions of the abnormality in relation to various vehicle dimensions, such as wheel base, track width, ground clearance and any other pertinent dimensions.

In one embodiment, degrees of severity within each road type may be assigned by dividing, the range of values of $w_{ROAD}$ into three groups of approximately equal size, and assigning values of $w_{ROAD}$ having relatively lower values a "small" degree of severity, assigning values of $w_{ROAD}$ having the next highest group of values a "medium" degree of severity, and assigning values of $w_{ROAD}$ having the highest group of values a "large" degree of severity.

In an alternative embodiment, the abnormal road type can be classified according to one of the previously described types and severities based on the estimated road heights $h_{wl}'$ and $h_{wr}'$ at each front wheel, as previously calculated. This enables road condition information gathered by one or more of the front wheels to possibly be used in controlling the suspension of the one or more of the rear wheels following the front wheels, and processing of the road-wheel interaction information need only be executed for the front wheel data.

Predicted or generated abnormal road condition information acquired as previously described can be used to synchronize with existing abnormal road digital map or survey data. If the confidence level in the estimated road type is high enough, then the road surface condition estimate can be used to modify the existing abnormal road digital map/survey data or even to generate a new abnormal road type entry in the digital map that can be saved at memory locations inside a vehicle ECU for future use. The estimate can also be used to "reset" existing road/survey data and/or GPS positions corresponding to the road/survey data to prevent or compensate for any drifting or error.

The following discussion provides an example of how an existing digital map of estimated abnormal road conditions may be modified using the newly determined road type estimate.

At a future time t, if the GPS system detects that the vehicle (whose location at any give moment is represented by GPS coordinates (x, y, z)) is approaching an abnormal road condition whose center location has GPS coordinates $(X_i, Y_i, Z_i)$ and whose road condition has been estimated or classified in accordance with the above-described method, then the estimated abnormal road type (as determined based on the method previously described) will be compared with the road type on record as applying to road position $(X_i, Y_i, Z_i)$.

If the estimated abnormal road type matches the road type on record, the road type at this location will be maintained as the road type indicated by the existing map.

If the estimated abnormal road type does not match the road type on the existing map, the existing digital map will either be modified to reflect the newly determined road type estimate at the given location, or the newly determined road type estimate will be integrated with the existing road type of record, based on the confidence level of the newly determined road type estimate.

The confidence level of road type estimation depends on the quality of the data provided by the laser scans and the suspension height sensors. The confidence level may be evaluated and quantified using any of several methods. For example, if the road condition estimate for a particular abnormal road feature derived from the laser scan data image correlates (to within a predetermined tolerance range) with the road condition estimate generated using data from physical interactions between the suspension and the abnormal road surface, then the confidence level of both road condition estimates may be deemed higher.

Conversely, if the road condition estimate for a particular abnormal road feature derived from the laser scan data image does not correlate (to within a predetermined tolerance range) with the road condition estimate generated using data from physical interactions between the suspension and the abnormal road surface, then the confidence level of both road condition estimates may be deemed lower. In instances where the confidence level is deemed to be relatively low, actuation of the suspension system elements responsive to the estimated road conditions may be delayed so as to avoid a less-than-optimum response to a possibly inaccurate road condition estimate.

In another example, if a historical record of road conditions at a given geographical location exists (for example, from an existing digital map of a stretch of road), and if any of the road condition estimates for the same location do not correlate (to within a predetermined tolerance range) with the historical record, the confidence level for one or both of the road condition estimates may be set at a medium level.

The above discussion can be implemented using algorithms incorporating the following computed variables:

$$i^* = \arg\min \|(x, y, z) - (X_i, Y_i, Z_i)\|$$

$$h^* = \|(x, y, z) - (X_{i^*}, Y_{i^*}, Z_{i^*})\| \quad (9)$$

where $\|\cdot\|$ denotes a vector norm reflecting the distance between the two sets of GPS coordinates, $i^*$ indicates the $i^*$th abnormal road feature that is closest to the current location, $h^*$ is the distance between the current location and the $i^*$ abnormal road feature.

If the estimated road type at GPS coordinates (x,y,z) is defined at as $T_{est}(x, y, z)$ and the road type in the existing digital map at location $(X_i, Y_i, Z_i)$ is defined as $T_{map}(X_i, Y_i, Z_i)$, then $T_{est}(x, y, z)$, $T_{map}(X_i, Y_i, Z_i)$, and $T(x, y, z)$ all belong to the finite set $\{0, 1, 2, 3, 4, 5, 6, 7\}$, where 0 corresponds to a normal road condition and i corresponds to the $q^{th}$ abnormal road type defined in TABLE 1 for q=1, 2, 3, 4, 5, 6, 7.

For a given vehicle velocity $v_x$, we define $\gamma(v_x)$ as a velocity dependent scalar. If the computed distance $h^*$ in (9) is equal to or less than such a scalar, such that:

$$h^* \leq \gamma(v_x) \quad (10)$$

then the vehicle, whose current location is reflected by the GPS coordinates (x,y,z), is determined to be approaching a road segment having GPS coordinates $(X_i, Y_i, Z_i)$ and which is currently characterized on the existing digital map as being of road type $T_{map}(X_i, Y_i, Z_i) \in \{1, 2, 3, 4, 5, 6, 7\}$.

If the confidence level of the road type estimate $T_{est}(x, y, z)$ is lower than a predetermined threshold value (e.g., 40% confidence level), then the calculated road type estimate should be replaced by the $i^{th}$ abnormal road type $T_{map}(X_i, Y_i, Z_i)$ obtained from the pre-existing abnormal road digital map.

If the estimated road type $T_{est}(x, y, z)$ does not match $T_{map}(X_i, Y_i, Z_i)$ when relation (10) is satisfied, a fusion or integration of $T_{est}(x,y,z)$ with $T_{map}(X_i, Y_i, Z_i)$ may be performed to provide a final road type $T(x, y, z)$ at the location:

$$T(x, y, z) \Xi [T_{map}(X_i, Y_i, Z_i), T_{est}(x, y, z)]$$

where $\Xi$ represents a smoothing strategy, weighted sum strategy or other mown means for achieving smooth integration between $T_{map}(X_i, Y_i, Z_i)$ and $T_{est}(x, y, z)$.

If a road condition is encountered where $T_{est}(x, y, z)$ conforms to one of the road condition types shown in the above table, but there is no i* such that the corresponding h* computed from existing digital map information satisfies relation (10), the following digital map entry will be initiated and added to the existing digital map:

$$(X_i, Y_i, Z_i) = (x, y, z)$$

$$T_{map}(X_i, Y_i, Z_i) = T_{est}(x, y, z) \quad (13)$$

For each of the abnormal road types shown in the above Table 1, the severity of the road abnormality is denoted by the following structured variable as:

$$T_{map}(X_i, Y_i, Z_i).\text{severity}$$

$$T_{est}(x, y, z).\text{severity}$$

$$T(x, y, z).\text{severity}$$

and the level of severity of the abnormality is defined as either a small abnormality, medium abnormality, or a large abnormality. These levels of abnormality for the road can be for example, related to the dimensions of the abnormality and/or the dimensions of the abnormality in relation to various vehicle dimensions such as wheel base track width, ground clearance and any other pertinent dimensions.

In a particular embodiment, first and second vehicles are each equipped with vehicle-to-vehicle (V2V) communication systems, and the first vehicle is equipped with components and systems structured for detecting and modeling abnormal road conditions and for acquiring and processing data relating to the detected abnormal road conditions, in accordance with the embodiments previously described. In a scenario where the first vehicle is traveling ahead of the second vehicle, information relating to the abnormal road condition can be readily communicated from the first (leading) vehicle to the second (following) vehicle. If the second vehicle is also equipped with components and systems structured for detecting and modeling abnormal road conditions and for acquiring and processing data relating to the detected abnormal road conditions in accordance with the embodiments previously described, the received abnormal road condition information can be further processed and/or integrated with information stored in vehicle memory. Such abnormal road information can also be similarly passed to surrounding vehicles.

In another particular embodiment, a vehicle equipped with the aforementioned sensing and processing systems is also equipped with a vehicle-to-infrastructure communication system (enabling communication from the vehicle to for example, roadside data receiver units that can change information with a transportation management or traffic data center). Then the abnormal road conditions can be reported to a road service crew and can aid the service crew in locating the abnormal road segment to facilitate repairs.

If information stored in an infrastructure memory or database indicates that abnormal roads having large degrees of severity are farther along the vehicle's current route (i.e., outside current sensor detection range), the vehicle controller may notify the driver of the pending road conditions and may also be configured to present one or more alternative routes to the driver.

If information stored in an infrastructure memory and/or database indicates or information processed by the suspension control system indicates there are abnormal road conditions ahead of a severity too great for the active suspension control system to accommodate without risk of damage to the vehicle, the controller may notify the driver and may also be configured to present one or more alternative routes to the driver.

In another particular embodiment, a vehicle equipped with mentioned sensing and processing systems is also equipped with a wireless or mobile system or device that can communicate with a cloud server. Then, information relating to the abnormal road conditions may be transmitted to the cloud and may be accessed by other drivers and vehicles having access to the cloud. If information received from the cloud indicates that higher-severity abnormal roads lie along the current vehicle route, the vehicle controller may notify the driver of the pending road conditions and may also be configured to present one or more alternative routes to the driver. Also, if information received from the cloud indicates there are abnormal road conditions ahead which are too severe for the active suspension control system to accommodate without unacceptable risk of damage to the vehicle, the vehicle controller may notify the driver of the pending road conditions and may also be configured to present one or more alternative routes to the driver.

In addition, other types of abnormal road surface information detected by the vehicle suspension or by sensors may be communicated to other vehicles, to infrastructure locations, or to cloud. For example, wheel longitudinal slip and/or vehicle side slip angle may (if outside predefined normal parameters and associated geographical location information be transmitted to other vehicles, to infrastructure locations, or to the cloud, and then stored for later access and updating. Then, from the infrastructure locations or to the cloud, this information may then be transmitted (or may be accessible by) additional vehicles traversing the location or strip of road where the abnormality is located. A driver of the vehicle receiving the information may use this information to engage vehicle safety features for mitigating the effects of the abnormal road condition on the vehicle. Alternatively, the vehicle may upon receipt of the abnormal road condition information, automatically or autonomously engage relevant safety features or systems. A driver may also use this information to plan an alternative route around the abnormal road condition, or the vehicle systems may (either automatically or at the direction of the driver) calculate a suitable alternative route.

In step 330, in a particular embodiment, when the abnormal road condition and severity been established, one or more control commands to actuatable elements of the active suspension system may be generated responsive to the road condition and severity, for controlling the suspension system responsive to the predicted or detected road surface conditions.

These control commands may be directed to compensating for the effect of the abnormal road condition on the vehicle, whereby minimizing the effect of the abnormal condition on ride quality. Control signals may be generated for and directed to elements of the chassis control system or the active suspension system, for example. Characteristics which may be modified to compensate for the effects of be abnormal road condition on the vehicle include the suspension forces, be suspension n spaces, the damping components of the suspension system, the stiffness components of c suspension system, and the anti roll component of the suspension systems.

In particular embodiments, the suspension stiffnesses and/or damping characteristics at one or more of the vehicle wheels are adjusted so as to prevent or mitigate negative effects on ride and passenger comfort resulting from contact between the vehicle wheels and the abnormal road surface feature. In addition, because the control commands are based on a prediction of the abnormal road surface features or on information relating to the actual road feature (gathered, for example, through previous interactions between one or more vehicles and the road feature), certain control commands may be implemented prior to actual contact between the vehicle wheels and the abnormal road surface feature.

As stated previously, the suspension system control commands can be generated based on various estimates of the road type. In one example, assume the current vehicle GPS location is $(x, y, z)$ and the final and estimated road type at the location $(X, Y, Z)$ is denoted as $T(X, Y, Z) \in \{0, 1, 2, 3, 4, 5, 6, 7\}$.

For a normal road condition (i.e., where $T(x, y, z)=0$), the road is assumed to be a normal road type and conventional smooth road active suspension control strategies may be applied. Such traditional suspension strategies include body control for ride comfort, wheel control for improved wheel road holding, and handling control. Where $T(x, y, z) \neq 0$ any of several approaches may be used. Nontraditional approaches are contemplated such that the active suspension system is adaptive to the 7 types of abnormal road conditions shown above. That is, cases are considered where:

$$T(x, y, z) \in \{0, 1, 2, 3, 4, 5, 6, 7\}$$

and each type of $T(x, y, z)$ has a different severity abnormality which is denoted as $$T(x, y, z).\text{severity} \in \{\text{small, medium, large}\}$$

The different abnormal road types for $T(x, y, z)$ will require different active suspension control strategies. The active suspension control strategies may be customized for each road type and its different severities of abnormality.

In one embodiment, the control architecture is similar to a known dual-loop control approach having an inner loop and an outer loop. The outer control loop sets the target active suspension forces or the target rattle spaces so as to respond to a specific type of road condition, based on vehicle level performance requirements. The inner control loop regulates the target values set by the outer loop, through the adjustment of suspension actuator level controls. The outer controls loop can be implemented in both feedback and feedforward fashion.

The following describes some task-oriented suspension control modes which may be implemented responsive to a given set of abnormal road conditions. Such modes include diagonal rolling control, three-wheel support control, zigzag maneuver control, alternating damping control, alternating stiffness control, and jumping control.

The timing and severity or magnitude of the generated control responses may be dependent on the type and severity of the abnormal road condition, vehicle performance requirements, the estimated time until the vehicle reaches or contacts the abnormal road feature, and other pertinent factors.

Diagonal Rolling Control DRC)

Diagonal Rolling Control (DRC) is an open-loop control scheme where the suspension forces provided by two wheel suspensions in first diagonal locations are adjusted so as to provide relatively larger suspension forces or increased dampening or stiffness, while the suspension forces provided by two wheel suspensions on second, opposite diagonal locations are adjusted so as to provide relatively smaller suspension forces or decreased dampening or stiffness. Such a suspension control mode allows the vehicle to roll about an axis extending through the first diagonal locations when a wheel in one of the second diagonal locations is disturbed by interaction with an abnormal road surface. This aids in reducing vehicle rolling and the shock to the vehicle. The magnitudes of the suspension forces provided by the second diagonal wheel suspensions may be automatically adjusted by a controller in relation to the magnitude of the calculated value of the road profile vector $w_{ROAD}$, such that the greater the road profile vector value magnitude, the lower the suspension forces in the second diagonal wheel suspensions. This enables the wheel suspensions at the second diagonal wheel locations to adapt to a wide variety of values of $w_{ROAD}$. Correlations between the magnitude of the calculated value of the road profile vector $w_{ROAD}$ and the appropriate associated dampening or stiffness values at the second diagonal suspensions may be determined by suspension testing prior to vehicle operation and stored a suitable memory operatively coupled to the controller.

DRC can also be utilized to increase the rattle spaces of the two suspensions along the first diagonal locations and decrease the rattle spaces of the two wheel suspensions along the second diagonal locations, thereby enabling the vehicle to handle a relatively larger disturbance met by a wheel in one of the second diagonal locations. In this way a wheel in one of the second diagonal locations can be lifted relatively easily due to rolling of the vehicle about the first diagonal axis. This feature, combined with use of the rattle space inherent in the wheel located at the one of the second diagonal locations, enables this wheel to climb over a larger obstacle.

Thus, DRC can combine suspension three-based "diagonal adjustment" with suspension rattle space-based diagonal adjustment as described above, thereby enhancing control capability.

Three Wheel Support (TWS)

Three Wheel Support (TWS) suspension control scheme wherein three wheels have relatively "hard" suspension settings that can support the vehicle body while the fourth wheel has a relatively "slack" suspension setting. Thus, the fourth wheel is free to elevate relatively higher (and more easily) from the ground, TWS can be applied through appropriate variation of suspension forces or rattle spaces, or through a combination of both methods.

The magnitude of the suspension force applied to be fourth wheel to provide the necessary "slack" may be automatically adjusted by a controller in relation to the magnitude of the calculated value of the road profile vector $w_{ROAD}$, such that the greater the road profile vector value magnitude, the lower the suspension force in the fourth wheel suspension. This enables the wheel suspensions at the second diagonal wheel locations to adapt to a wide variety of wanes of $w_{ROAD}$. Correlations between the magnitude of the calculated value of the road profile vector $w_{ROAD}$ and the appropriate associated dampening or stiffness values at the fourth wheel suspension may be determined by suspension testing prior to vehicle operation and stored in the controller or in a suitable memory operatively coupled to the controller. Advanced control/optimization methods (such as model predictive control, adaptive control, fuzzy control, etc.) can also be used as known in the art to further optimize the vehicle system responses.

Zigzag Maneuver Control (ZMC)

ZMC is an open loop suspension control scheme where the vehicle conducts a zigzag or "snake" maneuver to raise one front wheel at a time so as to climb over obstacles. ZMC integrates both steering control and suspension control to achieve the desired effect. The controlled steering system lifts a first front wheel by making that wheel an inside wheel through a short, sharp turn in the wheel's direction, while at the same time using the active suspension at the lifted first wheel to further raise the wheel. After the first turn is complete and the first wheel has climbed over an object, the steering control steers the vehicle sharply in the opposite direction to make the second front wheel an inside wheel to raise it, while at the same time the controlled suspension for the second wheel further raises this wheel. The angles to which the vehicle wheels are turned to execute the control commands may be calculated by the controller using such factors as the vehicle speed, the characteristics of the road surface abnormality, pertinent vehicle dimensions such as track width and ground clearance, and other pertinent factors.

Several methods and systems exist which are capable of controlling the steering in the manner required. Several of these systems use apply an "overlay" or modification to an existing steering wheel angle by applying a torque required to turn the wheel from the existing angle to a known, desired angle. One example of such a system is disclosed in U.S. Pat. No. 6,854,558, which is incorporated herein by reference in its entirety. Advanced control/optimization methods (such model predictive control, adaptive control, fuzzy control, etc.) can also be used as known in the art to further optimize the vehicle system responses.

Alternating Damping Control (ADC)

ADC is an open loop suspension control scheme where the suspension damping is adjusted to one setting just before an event (e.g., such as the wheel supported by the suspension encountering a speed bump) and is switched to another setting just after the event occurs.

Alternating Stiffness Control (ASC)

ASC is an open loop suspension control scheme where the suspension stiffness is adjusted to one setting just before an event and is switched to another setting after the event occurs, where the adjusting amount is related to the events.

The suspension stiffness can also be constantly adjusted for the vehicle to better adapt to the road.

Jumping Control (JC)

JC is an open loop suspension control scheme where the suspension is adjusted to generate a periodic heave and pitch motion that can cause the vehicle behave as if it will "jump", for example, over a road bump.

The following illustrates several examples of how the control schemes described above may be applied to actuate elements of the active suspension system for improving the vehicle's handling, ride comfort, and safety when on more wheels of the vehicle encounter one of the abnormal road conditions previously described. In the following scenarios, it is assumed to be certain or highly likely that the vehicle will encounter the abnormal road condition because, for example, there are no steerable paths around the abnormal road condition, or because the vehicle is travelling at a relatively high speed and the driver is unlikely to be able to respond to the abnormal road condition properly and/or in a timely fashion.

Active Suspension Adaptations Responsive to Road Condition Type 1 (Debris)

In this case, T(x, y, z)=1 and one wheel of the vehicle will encounter a relatively small piece of debris whose dimensions are larger than those encountered under normal road conditions where $T(x, y, z)=0$. In this case, the debris has dimensions less than the vehicle's track width, base, and ground clearance. If the estimating means predicts $T(x, y, z)=1$ and $T(x, y, z).severity=small$, the debris can be run over by the vehicle wheel without causing significant harm to the vehicle. The wheel suspensions spaced apart from the debris to one side of the debris can be adjusted to adapt to the debris. More specifically, these suspensions can be controlled to minimize the effect of the impact with the debris, to maximize driving comfort, and to optimize vehicle response immediately after passing the debris. Such optimization can be conducted through using such tools as model predictive control (MPG), adaptive control, fuzzy control, etc.

If the estimator means predicts $T(x, y, z)=1$ and $T(x, y, z).severity=medium$ for an abnormal section of the road, DRC control can be initiated such that the medium-size debris causes the vehicle to roll about an axis extending through second diagonal wheel locations, as previously described, responsive to contact with an impinging wheel located at one of the first diagonal wheel locations. The contacting wheel can also be elevated prior to contact with the debris so as to reduce the severity of the contact effects.

If the estimator means predicts $T(x, y, z)=1$ and $T(x, y, z).severity=large$, the ZMC mode can be initiated such that wheel contact with the debris can be avoided, or the severity of the contact effects are reduced. If the ZMC mode is not viable due to a lack of space surrounding the abnormal road condition, the ADC mode can be implemented such that suspension damping wheel contacting the debris will be reduced just before contacting the debris and increased just after contacting the debris. Advanced control/optimization methods (such as model predictive control, adaptive control, fuzzy control, etc.) can also be used as known in the art to further optimize the vehicle system responses.

Active Suspension Adaptations Responsive to Road Condition Type 2 (Bump)

In this case, $T(x, y, z)=2$, and two front wheels are likely to simultaneously contact a as a width greater than the vehicle's track width, a length less than the vehicle's base, and a height less than the vehicle's ground clearance. Some time after the front wheels pass the bump, the two' rear wheels will meet the bump. If the estimator means predicts $T(x, y, z)=2$ and $T(x, y, z).severity=small$, then the bump can be run over without causing significant harm to the vehicle. In this case, the vehicle suspension system elements will be adjusted to optimize the vehicle's dynamic response and ride comfort. In addition, optimization of the vehicle's step or pulse response may be implemented. The optimizations can be conducted through using such tools as Model Predictive Control, adaptive control, fuzzy control, etc.

If the estimator means predicts $T(x, y, z)-2$ and $T(x, y, z).severity=medium$, the ADC and ASC modes will be initiated. For instance, right before the wheel contacts the bump, the front wheel active suspension elements will be adjusted to increase the effective stiffness of the suspension, to aid in maintaining a good ground clearance. The front wheel active suspension elements will also be adjusted to decrease the effective damping of the suspensions, to reduce the shock effect of wheel impact. Immediately after the front wheels pass the bump, the front suspensions will be adjusted to increase their effective damping so that the vehicle's vibrations due to the impact can be damped out relatively quickly. The rear suspension controls will be adjusted in the same manner.

If the estimator means predicts $T(x, y, z)=2$ and $T(x, y, z).severity=large$, and the current vehicle speed is above a predetermined threshold value, the vehicle speed will be reduced to a predetermined limit. The suspension adjustment will implement one of the ZMC or JC control modes in an attempt to at least partially mitigate the forces generated by contact with the bump. In this case, the ZMC mode employs a small, sharp turn in one direction to lift one wheel over the bump and then another such turn in the opposite direction to lift the other wheel over the bump. At the same time, the suspension may employ suspension height management means to further raise the wheels.

Active Suspension Adaptations Responsive to Road Condition Type 3 (Pothole)

In this case, $T(x, y, z)=3$, and one wheel will encounter a hollow area having a width less than the vehicle's track width, a length less than the vehicle's base, and a depth less than the vehicle's ground clearance. If the estimator means predicts $T(x, y, z)=3$ and $T(x, y, z).severity=small$, actuation of the front left and right suspension elements will be coordinated to increase the roll stiffness coupling and/or to optimize the suspension responses. After the front wheels pass the pothole, actuation of the rear and right suspensions will be coordinated to increase the roll stiffness coupling and/or optimize the rear suspension responses. If the estimating means predicts $T(x, y, z)=3$ and $T(x, y, z).severity=\{medium\ or\ large\}$, suspension control will be integrated with the SM control mode to temporarily lift the wheel over the pothole. Alternatively, the TWS mode will be implemented such that the three wheels maintain road contact and the 4th wheel is lifted over the pothole. Advanced control/optimization methods (such as model predictive control, adaptive control, fuzzy control, etc.) can be used to further optimize the vehicle system responses.

Active Suspension Adaptations Responsive to Road Condition Type 4 (Drop)

In this case, $T(x, y, z)=4$, and there is a dip in the road surface having either a width larger than the vehicle's track width (a lateral road drop) or having a narrow width but a length larger than the vehicle's base (a longitudinal road drop, for example a road edge). In the lateral road drop case, the front two wheels will sink into the drop followed by the rear two wheels. In the road edge case, the wheels along one side of the vehicle will sink into the drop. If the estimator means predicts $T(x, y, z)=4$ for a lateral road drop with $T(x, y, z).severity=small$, the suspension control will optimize the vehicle's step response. If the estimator means predicts $T(x, t, z)=4$ for a lateral road drop with $T(x, y, z).severity=\{medium\ or\ large\}$, the following control strategies may be implemented. Just before the front wheels encounter the lateral drop, the front wheel suspensions will be adjusted to increase the suspensions' effective stiffness, to aid in maintaining sufficient ground clearance. Also the front wheel suspensions will be adjusted to decrease the suspensions' effective dampening to reduce the shock effect of wheel contact after the drop.

In addition, immediately after the front wheels pass the lateral drop, the front suspensions will be adjusted to increase their effective damping coefficients so that the vehicle's vibration due to the lateral drop can be damped out relatively quickly. The rear suspension controls will be adjusted so as to provide a similar effect. This control scheme is effectively a combination of the ADC and ASC modes. Advanced control/optimization methods (such as MPC, adaptive control, fuzzy control, etc.) can be used to further optimize the vehicle system responses.

Active Suspension Adaptations Responsive to Road Condition Type 5 (Rough Road)

In this case, T(x, y, z)=5 and the road surface has a relatively small level of unevenness (produced, for example, by the presence of gravel) which could introduce high frequency disturbances to the vehicle. Upon the;detection of this kind of abnormality, the damping coefficients of all the wheel suspensions will be increased and the relative stiffness of all the suspensions will be decreased. As in previous cases, optimization can be conducted through using such tools as model predictive control, adaptive control, fuzzy control, etc.

Active Suspension Adaptations Responsive to Road Condition Type 6 (Off-Road)

In this case, T(x, y, z)=6 and the off-road terrain ahead of the vehicle has a medium to large level of unevenness due to rocks, dirt, unpaved surfaces, etc. Upon the detection of such a condition, the suspension controls will be actuated so as to reduce anti-roll stiffness, thereby permitting better wheel-to-road contact. This acts to improve traction when the vehicle is driven in a straight line and at relatively high speeds. The suspension controls will also be actuated to increase anti-roll stiffness whenever the driver initiates an aggressive maneuver, such as a sharp turn, for example. In addition, ride comfort criteria will be relaxed to enhance drivability during off-road terrain driving. As before, the optimization can be conducted through using such tools as model predictive control, adaptive control, fuzzy control, etc.

Active Suspension Adaptations Responsive to Road Condition Type 7 (Obstacle)

In this case, T(x, y, z)=7 and the road ahead of the vehicle includes an object which has a height greater than the vehicle's ground clearance. If there are no steerable paths around the abnormal condition (for example, due to heavy traffic in adjacent lanes) or where the vehicle is driven at high speed under conditions where the driver may be unable to respond to adverse conditions properly and in a timely fashion, the active suspensions' effectiveness is limited and vehicle safety measures such as collision mitigation by braking (and/or steering) will be initiated. In order to better prepare the vehicle for accident avoidance responsiveness, the active suspension elements are adjusted according to a predetermined performance control setting or to so as to provide an overall optimized response, taking into account all the available actuators.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present on as defined in the appended claims.

What is claimed is:

1. A method for controlling an active suspension, comprising steps of:
   determining a dimension of a road abnormality ahead of the vehicle;
   comparing the dimension with a vehicle dimension;
   responsive to the comparison, classifying the abnormality as one type of a plurality of predetermined types;
   responsive to a dimension of the abnormality, further classifying the abnormality as having a severity of one type of a plurality of predetermined types; and
   controlling the suspension responsive to the abnormality type and severity type.

2. The method of claim 1 wherein the step of controlling the suspension comprises the step of controlling actuatable elements of the suspension prior to actual contact between the vehicle and the road abnormality.

3. The method of claim 1 wherein the step of determining a dimension of a road abnormality ahead of the vehicle comprises the step of determining estimated height, $h_{wl}'$ and $h^{wr'}$ at left and right front wheels, respectively, of a road surface at a location of the road abnormality.

4. The method of claim 1 wherein the step determining a dimension of a road abnormality ahead of the vehicle comprises the step of determining a road profile vector $W_{ROAD}$ representing a condition of the road surface at the road abnormality; and
   wherein the step of controlling the suspension comprises the step of controlling the suspension responsive to a magnitude of the road profile vector.

5. The method of claim 1 wherein the step of controlling the suspension comprises controlling the suspension by implementing a Diagonal Rolling Control scheme.

6. The method of claim 1 wherein the step of controlling the suspension comprises controlling the suspension by implementing a Three Wheel Support control scheme.

7. The method of claim 1 wherein the step of controlling the suspension comprises controlling the suspension by implementing a Zigzag Maneuver Control (ZMC) scheme.

8. The method of claim 1 wherein the step of controlling the suspension comprises controlling the suspension by implementing an Alternating Damping Control scheme.

9. The method of claim 1 wherein the step of controlling the suspension comprises controlling the suspension by implementing an Alternating Stiffness Control scheme.

10. The method of claim 1 wherein the step of controlling the suspension comprises controlling the suspension by implementing a Jumping Control scheme.

* * * * *